United States Patent [19]

Bootz et al.

[11] Patent Number: 5,541,300
[45] Date of Patent: Jul. 30, 1996

[54] AZO DYESTUFFS CARRYING SULPHONYLATED AMINO-HALO-TRIAZINYL REACTIVE SITE PLUS SECOND DIFFERENT SITE

[75] Inventors: Konrad Bootz, Wetter; Eckhard Bock; Manfred Hoppe, both of Kürten; Wolfram Reddig, Leverkusen, all of Germany

[73] Assignee: Bayer Aktiengesellschaft, Leverkusen, Germany

[21] Appl. No.: 250,729

[22] Filed: May 27, 1994

[30] Foreign Application Priority Data

Jun. 4, 1993 [DE] Germany ............... 43 18 620.3

[51] Int. Cl.[6] ............... C09B 62/006; C09B 62/08; D06P 1/38
[52] U.S. Cl. ............... 534/605; 534/612; 534/634
[58] Field of Search ............... 534/634, 605, 534/612

[56] References Cited

U.S. PATENT DOCUMENTS

| | | | |
|---|---|---|---|
| 3,718,641 | 2/1973 | Muller et al. | 534/636 |
| 4,515,598 | 5/1985 | Meininger et al. | 8/549 |
| 4,568,350 | 2/1986 | Rohrer | 8/543 |
| 4,649,193 | 3/1987 | Meininger et al. | 534/622 |
| 4,746,732 | 5/1988 | Tzikas | 534/637 |
| 4,845,203 | 7/1989 | Dietz et al. | 534/637 |
| 4,935,501 | 6/1990 | Tzikas | 534/634 |
| 4,996,304 | 2/1991 | Tzikas | 534/637 |
| 5,270,454 | 12/1993 | Hoppe et al. | 534/634 |
| 5,342,927 | 8/1994 | Redding et al. | 534/618 |
| 5,420,256 | 5/1995 | Eizenhofer et al. | 534/634 X |

FOREIGN PATENT DOCUMENTS

| | | |
|---|---|---|
| 70807 | 1/1983 | European Pat. Off. . |
| 70808 | 1/1983 | European Pat. Off. . |
| 70806 | 1/1983 | European Pat. Off. . |
| 85654 | 8/1983 | European Pat. Off. . |
| 0126026 | 4/1984 | European Pat. Off. . |
| 0133843 | 7/1984 | European Pat. Off. . |
| 0167490 | 1/1985 | European Pat. Off. . |
| 0307817 | 9/1988 | European Pat. Off. . |
| 0443165 | 2/1990 | European Pat. Off. . |
| 0525572 | 7/1991 | European Pat. Off. . |
| 1291182 | 10/1972 | United Kingdom . |
| 1576237 | 10/1980 | United Kingdom . |

*Primary Examiner*—Fiona T. Powers
*Attorney, Agent, or Firm*—Sprung Horn Kramer & Woods

[57] ABSTRACT

Trifunctional reactive dyestuffs of the formula

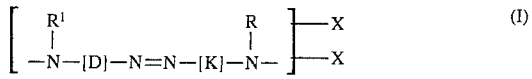

a process for their preparation and their use, wherein
D=the radical of a diazo component of the benzene or naphthalene series,
K=the radical of a coupling component of the formula

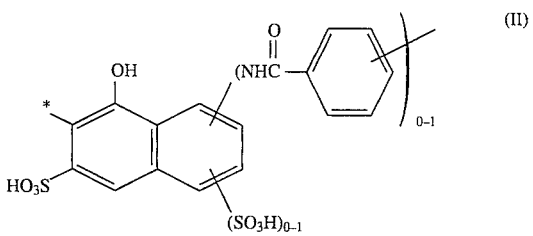

where the radical of the formula II and the azo group are linked to one another via the bond marked with *,
X=a radical of the formula

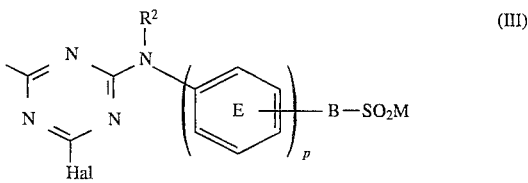

Z=a heterocyclic fibre-reactive radical which differs from X
and the other substituents have the meaning given in the description.

12 Claims, No Drawings

AZO DYESTUFFS CARRYING SULPHONYLATED AMINO-HALO-TRIAZINYL REACTIVE SITE PLUS SECOND DIFFERENT SITE

The invention relates to new trifunctional reactive dyestuffs, their preparation and their use.

Reactive dyestuffs are already known from numerous publications, see DE-A 30 19 960 (U.S. Pat. No. 4,515,598), DE-A-19 22 940, EP-A-132 223 (U.S. Pat. No. 3,718,641), EP-A-167 490, EP-A-133 843 (U.S. Pat. Nos. 4,746,732, 4,935,501, 4,996,304), EP-A-40 806 and EP-A-307 817 (US-A4,649,193).

The present invention is based on the object of providing improved reactive dyestuffs.

The invention relates to reactive dyestuffs of the formula

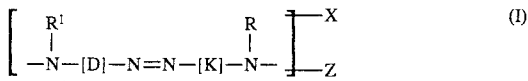

wherein
D=the radical of a diazo component of the benzene or naphthalene series,
K=the radical of a coupling component of the formula

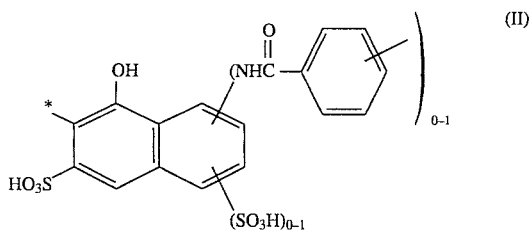

wherein the radical of the formula II and the azo group are linked to one another via the bond marked with *,
X=a radical of the formula

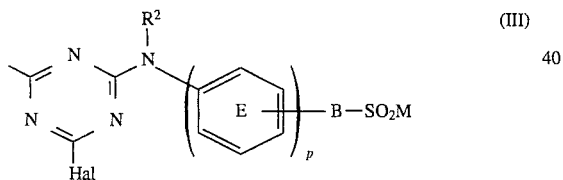

and the benzene ring E is optionally further substituted, preferred substituents being Cl, Br, SO$_3$H, COOH, C$_1$–C$_4$-alkyl and C$_1$–C$_4$-alkoxy,
Z=a heterocyclic fibre-reactive radical which differs from X,
R and R$^1$=independently of one another H or C$_1$–C$_6$-alkyl which is optionally substituted by substituents such as, for example, halogen, OH, COOH, SO$_3$H or OSO$_3$H,
R$^2$=H, C$_1$–C$_4$-alkyl or phenyl, which is optionally substituted by, for example, C$_1$–C$_4$-alkyl, SO$_3$H, COOH, C$_1$–C$_4$-alkoxy, Cl or Br,
Hal=halogen, in particular F or Cl,
p=0 or 1,
B=—(CH$_2$)$_m$—or —(CH$_2$)$_2$—O—(CH$_2$)$_2$—,
m=a number from 1 to 6 and
M=CH=CH$_2$ or CH$_2$ CH$_2$—V, wherein
V=OH or a radical which can be split off under alkaline conditions, for example OSO$_3$H, SSO$_3$H, OCOCH$_3$, OPO$_3$H$_2$, OSO$_2$CH$_3$, SCN, NHSO$_2$CH$_3$, Cl, Br, F, OCOC$_6$H$_5$, OSO$_2$–C$_6$H$_4$, [N(CH$_3$)$_3$]$^\ominus$anion$^\ominus$ or an optionally substituted pyridinium radical (substituents on the pyridinium radical are, in particular, optionally substituted C$_1$–C$_4$-alkyl, COOH, SO$_3$H, CN or carboxamide), (anion=for example, Cl$^\ominus$, HSO$_4^\ominus$, HCO$_3^\ominus$ and the like).

Suitable fibre-reactive radicals Z, that is to say those which react with the OH or NH groups of fibres under dyeing conditions to form covalent bonds, are preferably those which contain at least one reactive substituent bonded to a 5- or 6-membered aromatic-heterocyclic ring, or on a monoazine, diazine or triazine ring, in particular a pyridine, pyrimidine, pyridazine, pyrazine, thiazine, oxazine or asymmetric or symmetric triazine ring, or on such a ring system which contains one or more fused-on aromatic-carbocyclic rings, for example a quinoline, phthalazine, cinnoline, quinazoline, quinoxaline, acridine, phenazine or phenanthridine ring system, and which are not bonded to a further chromophore.

Examples which may be mentioned of reactive substituents on the heterocyclic radical are halogen (Cl, Br or F), ammonium, including hydrazinium, pyridinium, picolinium, carboxypyridinium, sulphonium, sulphonyl, azido(N$_3$), thiocyanato, thiol ether, oxyether, sulphinic acid and sulphonic acid.

The following radicals may be mentioned specifically, for example, for Z:

2,4-difluorotriazin-6-yl, 2,4-dichlorotriazin-6-yl and monohalogeno-sym.-triazinyl radicals, in particular monochloro- and monofluorotriazinyl radicals, which are substituted by alkyl, aryl, amino, monoalkylamino, dialkylamino, aralkylamino, arylamino, morpholino, piperidino, pyrrolidino, piperazino, alkoxy, aryloxy, alkylthio or arylthio, wherein alkyl preferably denotes optionally substituted C$_1$–C$_4$-alkyl, aralkyl preferably denotes optionally substituted phenyl-C$_1$–C$_4$-alkyl and aryl preferably denotes optionally substituted phenyl or naphthyl, and wherein preferred substituents for alkyl are halogen, hydroxyl, cyano, dialkylamino, morpholino, C$_1$–C$_4$-alkoxy, carboxyl, sulpho or sulphato and preferred substituents for phenyl and naphthyl are sulpho, C$_1$–C$_4$-alkyl, C$_1$–C$_4$-alkoxy, carboxyl, halogen, acylamino, hydroxyl and amino. Radicals which should furthermore be mentioned are 2-amino-4-fluoro-triazin-6-yl, 2-methylamino-4-fluorotriazin-6-yl, 2-ethylamino-4-fluorotriazin-6-yl, 2-isopropylamino-4-fluoro-triazin-6-yl, 2-dimethylamino-4-fluorotriazin-6-yl, 2-diethylamino-4-fluorotriazin-6-yl, 2-β-methoxyethylamino-4-fluoro-triazin-6-yl, 2-β-hydroxyethylamino-4-fluoro-triazin-6-yl, 2-di-(β-hydroxyethylamino)- 4-fluoro-triazin-6-yl, 2-carboxymethylamino-4-fluoro-triazin- 6-yl, 2-di-(carboxymethyl-amino)- 4-fluorotriazin-6-yl, 2-sulphomethyl-methylamino-4-fluoro-triazin-6-yl, 2-β-cyanoethylamino-4-fluoro-triazin-6-yl, 2-benzylamino-4-fluoro-triazin-6-yl, 2-β-phenylethylamino- 4-fluoro-triazin-6-yl, 2-benzyl-methyl-amino-4-fluoro-triazin-6-yl, 2-(4'-sulphobenzyl)-amino-4-fluoro-triazin-6-yl, 2-cyclohexylamino-4-fluoro-triazin-6-yl, 2-(o-, m- or p-methylphenyl)-amino-4-fluorotriazin-6-yl, 2-(o-, m- or p-sulphophenyl)-amino-4-fluoro-triazin- 6-hl, 2-(2',5'-disulphophenyl)-amino-4-fluoro-triazin- 6-yl, 2-(o-, m- or p-chlorophenyl)-amino-4-fluoro-triazin- 6-yl, 2-(o-, m- or p-methoxyphenyl)amino- 4-fluoro-triazin-6-yl, 2-(2'-methyl-4'-sulphophenyl)-amino- 4-fluoro-triazin-6-yl, 2-(2'-methyl-5'-sulphophenyl)-amino- 4-fluoro-triazin-6-yl, 2-(2'-chloro-5'-sulphophenyl)-amino-4-fluoro-triazin-6-yl, 2-(2'-chloro- 5'-sulphophenyl)-amino-4- fluoro-triazin-6-yl, 2-(2'-methoxy-4'-sulphophenyl)-amino-4-fluoro-triazin-6-yl, 2-(o-, m- or p-carboxyphenyl)-amino-4-fluoro-triazin-6-yl, 2-(2',4'-disulphophenyl)-amino-4-fluoro-triazin-6-yl, 2-(3',5'-disulphophenyl)-amino-4-fluoro-triazin-6-yl, 2-(2'-carboxy-4'-sulphophenyl)-amino-4-fluoro-triazin-6-yl, 2-(2'-carboxy-5'-sulphophenyl)-amino-4-fluorotriazin-6-yl, 2-(6'-sulphonapth-2'-yl)-amino-4-fluorotriazin-6-yl, 2-(4',8'-disulphonaphth-2'-yl)-amino-4-fluoro-triazin- 6-yl, 2 -(6',8'-disulphonaphth-2'-yl)amino-4-fluoro-triazin-6-yl, 2-(N-methyl-N-phenyl)-amino-4-fluoro-triazin-6-yl, 2-(N-ethyl-N-phenyl)-amino-4-fluoro-triazin- 6-yl, 2 -(N-β-hydroxyethyl-N-phenyl)-amino-4-fluoro-triazin-6-yl, 2-(N-iso-propyl-N-phenyl)-amino-4-fluoro-triazin-6-yl, 2-morpholino-4-fluoro-triazin-6-yl, 2-piperidino-4-fluoro-triazin-6-yl, 2-(4',6', 8'-trisulphonaphth-2'-yl)-amino-4-fluoro-triazin-6-yl, 2-(3',6',8'-trisulphonaphth-2'-yl)-amino-4-fluorotriazin-6-yl, 2-(3',6'-disulphonaphth-1'-yl)-amino-4-fluoro-triazin-6-yl, N-methyl-N-(2,4-dichlorotriazin-6-yl)-carbamyl, N-methyl-N-(2-methylamino-4-chlorotriazin-6-yl)-carbamyl, N-methyl-N-(2-dimethylamino-4-chlorotriazin-6-yl)-carbamyl, N-methyl- or N-ethyl-N-(2,4-dichlorotriazin- 6-yl) -aminoacetyl, 2-methoxy-4-fluorotriazin-6-yl, 2-ethoxy-4-fluoro-triazin-6-yl, 2-phenoxy-4-fluoro-triazin-6-yl, 2-(o-, m- or p-sulphophenoxy)-4-fluoro-triazin- 6-yl, 2-(o-, m- or p-methyl or -methoxyphenoxy)-4-fluoro-triazin-6-yl, 2-β-hydroxyethylmercapto-4-fluoro-triazin-6-yl, 2-phenylmercapto-4-fluoro-triazin- 6-yl, 2-(4'-methylphenyl)-mercapto-4-fluorotriazin- 6-yl, 2-(2',4'-dinitrophenyl) -mercapto-4-fluoro-triazin- 6-yl, 2 -methyl-4 -fluoro-triazin-6-yl, 2 -phenyl-4-fluoro-triazin-6-yl and the corresponding 4-chloro- and 4-bromo-triazinyl radicals, and the corresponding radicals obtainable by replacement of halogen by tertiary bases, such as trimethylamine, triethylamine, dimethyl-β-hydroxyethylamine, triethanolamine, N,N-dimethylhydrazine, pyridine, α-, β- or γ-picoline, nicotinic acid or isonicotinic acid, sulphinates, in particular benzenesulphinic acid, or hydrogen sulphite, as well as di- or trihalogenopyrimidinyl radicals, such as 2,4-dichloropyrimidin-6-yl, 2,4,5-trichloro-pyrimidin- 6-yl, 4,5-dichloropyrimidin-6-yl, 2,4-difluoropyrimidin-6-yl, 4,5-difluoro-pyrimidin-6-yl, 4-fluoro-5-chloropyrimidin-6-yl or 2,4-difluoro-5-chloropyrimidinyl, as well as 2,3-dichloroquinoxaline-5-carbonyl and 2,3-dichloroquinoxaline-6-carbonyl.

The reactive dyestuffs of the formula (I) have two possible forms

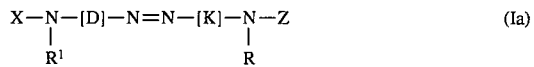   (Ia)

and

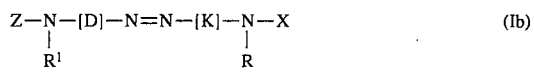   (Ib)

Preferred reactive dyestuffs of the formula I are those wherein

K denotes a bivalent radical of a coupling component of the general formula

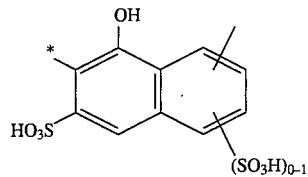   (IIa)

or

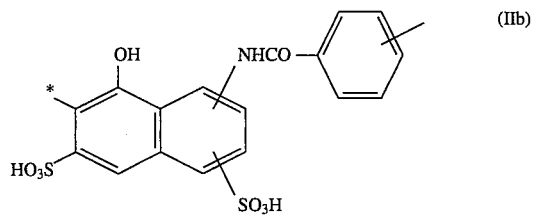   (IIb)

wherein the radical (IIa) or (IIb) and the azo group are linked to one another via the bond marked with *, D denotes a radical of a diazo component of the general formula

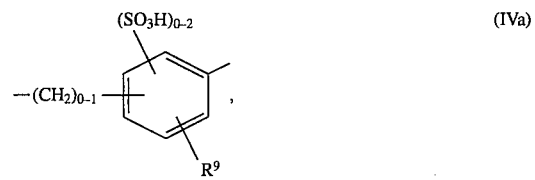   (IVa)

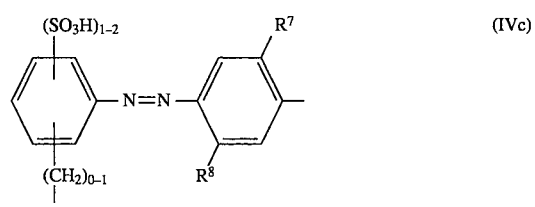   (IVb)

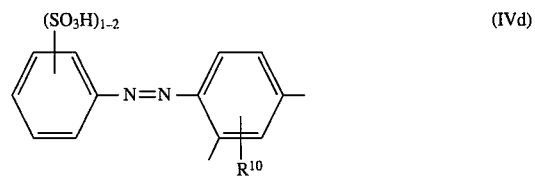   (IVc)

or (IVd)

and $R^7$=H, $C_1$–$C_4$-alkyl, $C_1$–$C_4$-alkoxy, OH or $SO_3H$, $R^8$=H, $C_1$–$C_4$-alkyl, $C_1$–$C_4$-alkoxy, acylamino, in particular $C_1$–$C_4$-alkylcarbonylamino, $C_1$–$C_4$-alkylsulphonylamino or aminocarbonylamino, $R^9$ and $R^{10}$=independently of one another H, $CH_3$, $C_2H_5$ or $OCH_3$ and X, R, Z and $R^1$ have the abovementioned meanings.

Reactive dyestuffs which are furthermore preferred are those of the formula (Ia)

$$X-N-[D]-N=N-[K]-N-Z \quad \text{(Ia)}$$
$$\phantom{X-N-}|\phantom{[D]-N=N-[K]-}|$$
$$\phantom{X-N-}R^1 \phantom{[D]-N=N-[K]-}R$$

wherein

K denotes a radical of the formula (IIc)

[structure IIc: naphthalene with OH, two SO₃H (HO₃S and SO₃H), with * marking bond position]

wherein the radical of the formula (IIc) and the azo group are linked to one another via the bond marked with *

R represents hydrogen,

Z denotes a radical of the formula

[structure: triazine with F, and morpholine substituent]

and D, $R^1$ and X have the abovementioned meaning.

In another preferred embodiment, preferred dyestuffs of the formula I are those wherein X denotes a radical of the formula

[structure IIIa: triazine ring with $R^2$, N, Hal, and $(CH_2)_m-SO_2M$ substituents]

wherein $R^2$=H or phenyl which is optionally substituted by, preferably, $CH_3$, $C_2H_5$ or $SO_3H$, in particular unsubstituted phenyl, m=2 or 3, Hal=F or Cl, M=CH=CH$_2$ or CH$_2$CH$_2$V, where V=C$_1$ or OSO$_3$H.

Reactive dyestuffs according to the invention which are furthermore preferred are those of the formula (I) or (Ia)–(Ib) wherein Z denotes a fibre-reactive fluorine-containing pyrimidin-6-yl radical or a radical of the formula

[structure V: triazine with $NR^4R^5$ and Y substituents]

wherein $R^4$ and $R^5$ independently of one another denote H, $C_1$–$C_4$-alkyl and $C_5$–$C_6$-cycloalkyl each of which is optionally substituted by substituents such as, for example, halogen, cyano, $C_1$–$C_4$-alkoxy, hydroxyl, phenyl, carboxyl, sulpho or sulphato, for example benzyl, phenethyl or cyclohexyl, or $C_6$–$C_{10}$-aryl, in particular phenyl or naphthyl, optionally substituted by substituents such as halogen, nitro, cyano, trifluoromethyl, sulphamoyl, carbamoyl, $C_1$–$C_4$-alkyl, $C_1$–$C_4$-alkoxy, $C_1$–$C_4$-alkanoylamino, benzoylamino, ureido, hydroxyl, carboxyl, sulphomethyl or sulpho, or wherein $R^4$ and $R^5$, together with the amino nitrogen atom, form a morpholino, piperidino or piperazino radical, and wherein Y=Cl, F or a pyridinium radical which is optionally substituted by, for example, COOH or SO$_3$H.

Particularly preferred reactive dyestuffs of the formula (I) are those wherein

[structure IIIb: X = triazine ring with $R^2$, N, Hal, and $(CH_2)_2-SO_2M$ substituents]

where $R^2$=phenyl,

Hal=F or Cl,

M=CH=CH$_2$ or CH$_2$CH$_2$OSO$_3$H and

D, K, Z, R and $R^1$ have the abovementioned meaning.

Reactive dyestuffs of the formulae (2)–(12) are particularly preferred:

[structure (2): phenyl with HN–, (SO₃H)₁₋₂, azo-linked to naphthol with HO, HO₃S, bearing N(R)– linked to X and Z]

[structure (3): naphthalene system with (SO₃H)₁₋₂, (CH₂)₀₋₁–NH–, azo-linked to naphthol with OH, NH–(CO)–, SO₃H, SO₃H, with phenyl–NH— (0-1), linked to X and Z]

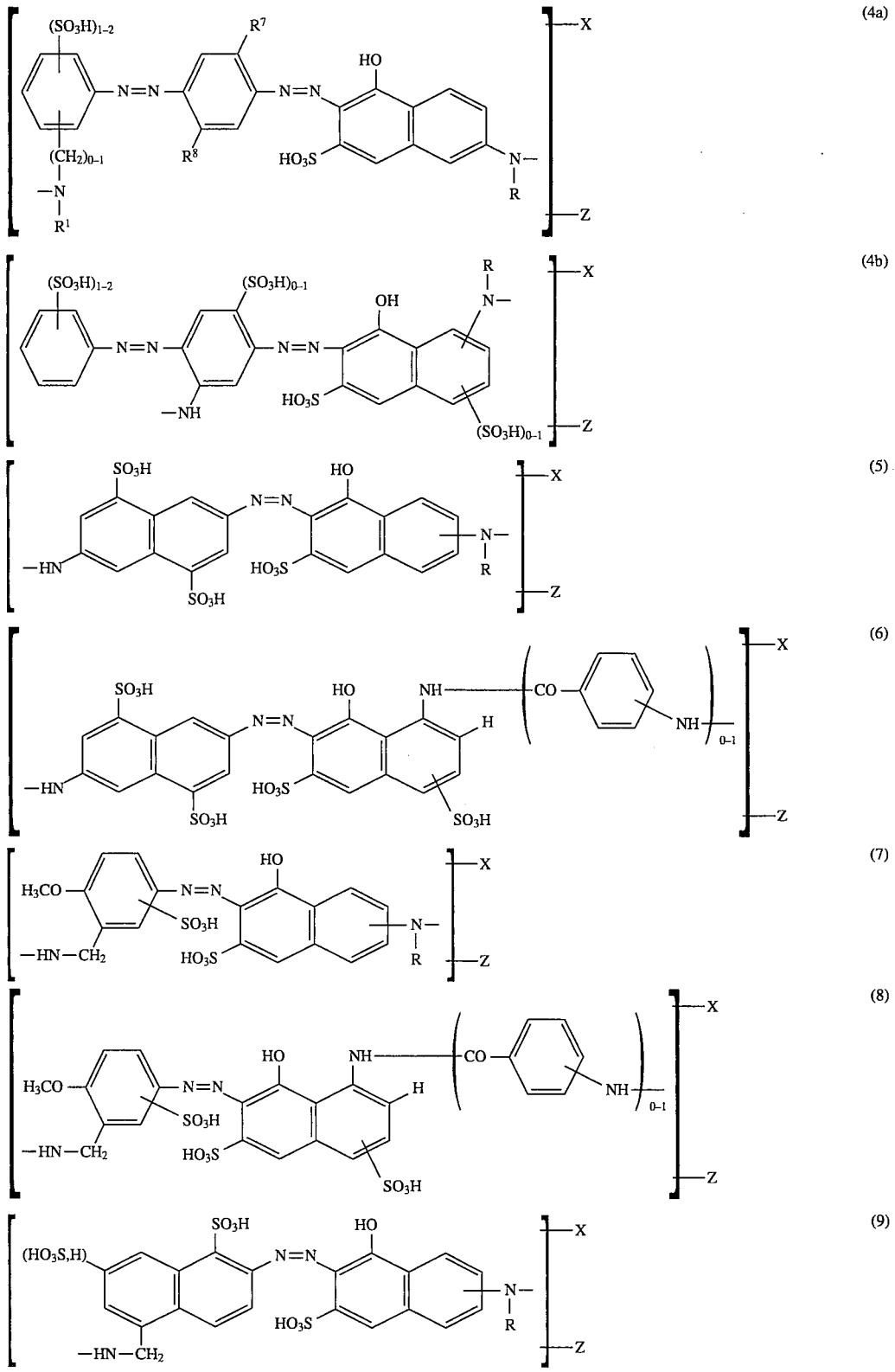

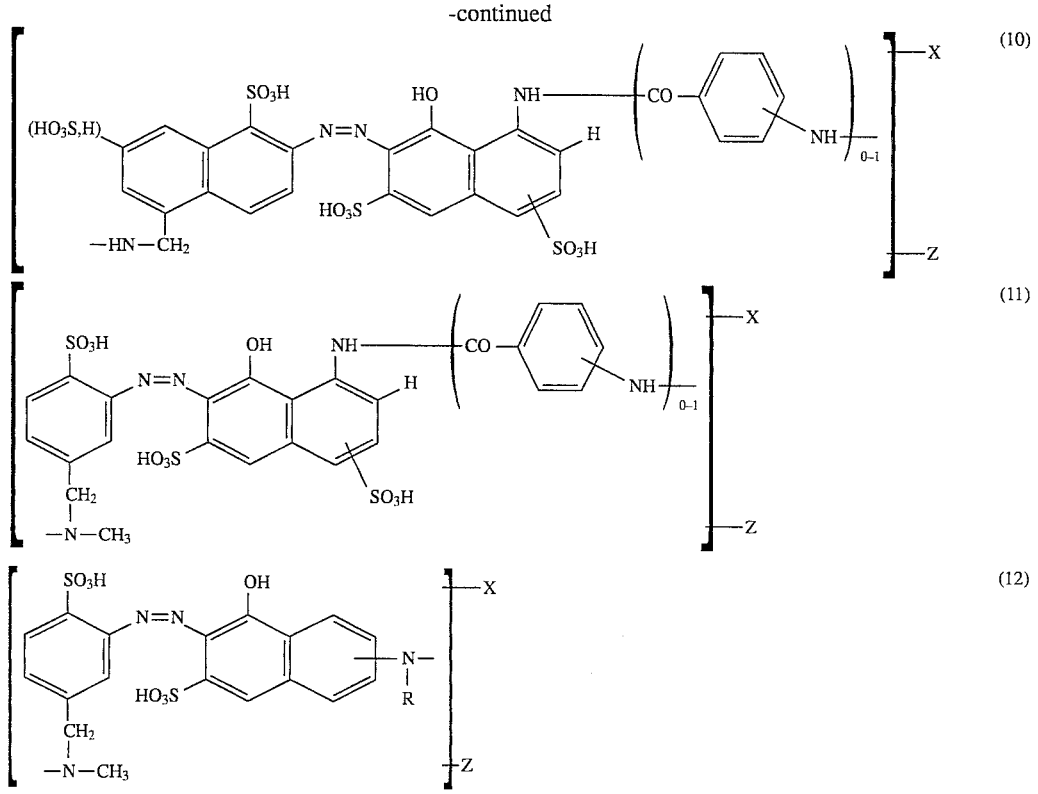
wherein
R=H, CH₃ or ethyl and
R¹, R⁷, R⁸, X and Z have the abovementioned meaning.
Especially preferred reactive dyestuffs are those of the formula (13)
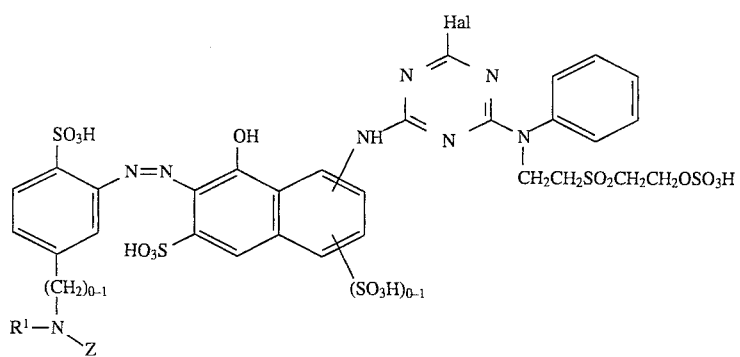
wherein
Z=a fibre-reactive pyrimidinyl radical,
R¹=H, CH₃ or C₂H₅ and
Hal represents F or Cl.
Especially preferred reactive dyestuffs are above all, however, those of the formula (14)

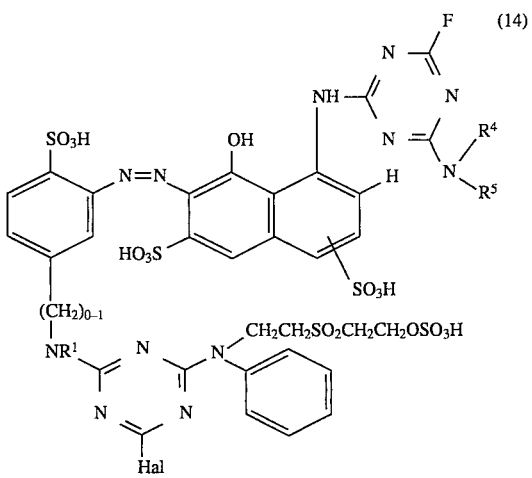

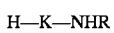

wherein

Hal=Cl or F,

R$^1$=H, CH$_3$ or C$_2$H$_5$ and

R$^4$ and R$^5$ have the abovementioned meaning.

Particularly preferred reactive dyestuffs are, above all, those of the formulae (2) to (14) wherein Z is a fluoro-s-triazine radical substituted by —NR$_4$R$_5$, wherein —NR$_4$R$_5$ preferably represents: —NH$_2$, morpholino, N-β-hydroxyethylamino, N,N-di-β-hydroxyethylamino, β-sulphoethylamino, phenylamino, which is optionally substituted on the phenyl nucleus by chlorine, methyl, ethyl, methoxy, ethoxy, acetylamino, hydroxyl, carboxyl, sulphomethyl or sulpho, N—C$_{1-4}$-alkyl-phenylamino, which is optionally substituted on the phenyl nucleus by Chlorine, methyl or ethyl, N-(sulpho-C$_{1-4}$-alkyl)-phenylamino, which is optionally substituted on the phenyl nucleus by chlorine, methyl or ethyl, N-(hydroxy-C$_{1-4}$-alkyl)-phenylamino or sulphonaphthylamino.

The invention furthermore relates to a process for the preparation of reactive dyestuffs of the formula (I), characterized in that dyestuffs of the formula

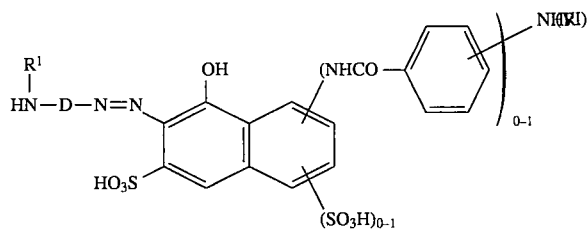

are reacted in any desired sequence with in each case one molar equivalent of the reactive component of the formula

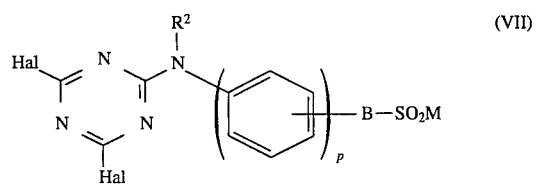

and the reactive component of the formula

Z-Hal            (VIII)

or in that the corresponding dyestuff precursors of the formulae

R$^1$—NH—D—NH$_2$ and

H—K—NHR are each reacted with in each case one molar equivalent of the reactive component of the formula (VII) or (VIII) and the products are converted into the reactive dyestuffs of the formula (I) by diazotization and coupling and if appropriate further conversion reactions, the meaning of the radicals and indices R, R$^1$, R$^2$, Hal, B, p and M corresponding to those mentioned above.

In the preparation of the preferred azo dyestuffs, the diazo component and the coupling component together possess two amino groups —N(R)H and —N(R$^1$)H, and if appropriate further acylatable amino groups. Corresponding acetylamino or nitro compounds are used if appropriate, the acetylamino or nitro group being converted into the NH$_2$ group by hydrolysis or reduction before the condensation with a halogenotriazine, halogenopyrimidine or the like. The reactive radicals X and Z are introduced by condensation of dyestuffs or dyestuff precursors which contain acylatable amino groups with fibre-reactive halogenated acylating agents.

Since the individual process steps mentioned above can be carried out in different sequences, various process variants are possible. In general, the reactions are carried out stepwise in succession, the sequence of the simple reactions between the individual reaction components advantageously depending on the particular conditions.

Since hydrolysis of a halogenotriazine or halogenopyrimidine radical and the like occurs under certain preconditions, an intermediate product which contains acetylamino groups must be hydrolysed, for the purpose of eliminating the acetyl groups, before it is subjected to condensation with an aminodifluorotriazine or trifluorotriazine and the like. A possible further conversion reaction is, for example, subsequent reaction of a dihalogenotriazinyl radical with an amine. The reaction which is expediently to be carried out first in the preparation of a secondary condensation product from the amine HNR$_4$R$_5$, the 2,4,6-trihalogeno-s-triazine and diaminobenzenesulphonic acid, that of the trihalogenotriazine with the amine or with the diaminobenzenesulphonic acid, varies from case to case and depends above all on the solubility of the amino compounds participating and on the basicity of the amino groups to be acylated. The most important process variants are represented in the embodiment examples.

Suitable starting compounds for the preparation of mono- or polyazo dyestuffs (I) are, for example:

Diazo components (R$^1$—NH—D—NH$_2$)

1,3-Diaminobenzene, 1,4-diaminobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino- 2-ethoxybenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino- 2,5-diethoxybenzene, 2,6-diamino-naphthalene, 1,3-diamino-2,4,6-trimethylbenzene, 1,4-diamino-2,3,5,6-tetramethylbenzene, 1,3-diamino-4-nitrobenzene, 4,4'-diaminostilbene, 4,4'-diaminodiphenylmethane, 2,6-diaminonaphthalene- 4,8-disulphonic acid, 1,4-diaminobenzene-2-sulphonic acid, 1,4-diaminobenzene-2,5-disulphonic acid, 1,4-diaminobenzene-2,6-disulphonic acid, 1,3-diaminobenzene-4-sulphonic acid, 1,3-diaminobenzene4,6-disulphonic acid, 1,4-diamino-2-methylbenzene-5-sulphonic acid, 1,5-diamino-6-methylbenzene-3-sulphonic acid, 1,3 -diamino- 6 -methylbenzene-4 - sulphonic acid, 3-(3'- or 4'-aminobenzoylamino)-1-aminobenzene-6-sulphonic acid, 1-(4'-aminobenzoylamino) -4-aminobenzene-2,5-disulphonic acid, 1,4-diaminobenzene-2-carboxylic acid, 1,3-diaminobenzene-4-carboxylic acid, 1,2-diaminobenzene- 4-carboxylic acid, 1,3-diaminobenzene-5-carboxylic acid, 1,4-diamino-2-methylbenzene, 4,4'-diaminodiphenyl oxide, 4,4'-diaminodiphenylurea-2,2'-disulphonic acid, 4,4'-diaminodiphenyloxyethane-2,2'-disulphonic acid, 4,4'-diaminostilbene-2,2'-disulphonic acid, 4,4'-diaminodiphenylethane-2,2'-disulphonic acid, 2-amino-5-aminomethylnaphthalene-1-sulphonic acid, 2-amino-5-aminomethylnaphthalene-1,7-disulphonic acid, 1-amino-4-methoxy-5-aminomethylbenzene-6-sulphonic acid, 1-amino-3-(N-methyl)-aminomethylbenzene-6-sulphonic acid, 1-amino-4-(N-methyl)-aminomethylbenzene-3-sulphonic acid, 1-amino-4-aminomethylbenzene-3-sulphonic acid, 1,3-diaminobenzene- 4-(azophenyl-4'-sulphonic acid), 1,3-diaminobenzene- 4-(azophenyl-2',4'-disulphonic acid), 1,3-diaminobenzene-6-sulphonic acid-4-(azophenyl-4'-sulphonic acid) and 1, 3-diaminobenzene-6-sulphonic acid-4-(azophenyl-3',6'-disulphonic acid)

If an aminoacetylamino compound from which the acetyl group is subsequently split off again by hydrolysis is to be employed as the diazo component instead of a diamine, as is described above in the explanations of the process variants, the monoacetyl compounds of the abovementioned diazo components are possible, for example 1-acetylamino-3-aminobenzene-4-sulphonic acid or 1-acetylamino-4-aminobenzene- 3-sulphonic acid.

Coupling components (H—K—NRH)

1-Amino-8-hydroxynaphthalene-6-sulphonic acid, 1-amino-8-hydroxynaphthalene- 2,4-disulphonic acid, 2-hydroxy-3-aminonaphthalene- 5,7-disulphonic acid, 1-amino-8-hydroxynaphthalene- 2,4,6-trisulphonic acid, 1-hydroxy-8-acetylaminonaphthalene- 3-sulphonic acid, 2-amino-5-hydroxynaphthalene-7-sulphonic acid, 2-methyl- or 2-ethylamino-5-hydroxynaphthalene-7-sulphonic acid, 2-(N-acetyl-N-methylamino)- 5-hydroxynaphthalene-7-sulphonic acid, 2-acetylamino-5-hydroxynaphthalene-7-sulphonic acid, 2-amino-5-hydroxynaphthalene-1,7-disulphonic acid, 2-amino-8-hydroxynaphthalene-6-sulphonic acid, 2-methyl- or 2-ethylamino-8-hydroxynaphthalene-6-sulphonic acid, 2-(N-acetyl-N-methylamino)-8-hydroxynaphthalene-6-sulphonic acid, 2-acetylamino-8-hydroxynaphthalene-6-sulphonic acid, 2-amino-8-hydroxynaphthalene-3,6-disulphonic acid, 2-acetylamino-8-hydroxynaphthalene-3,6-disulphonic acid, 1-amino-5-hydroxynaphthalene-7-sulphonic acid, 1-amino-8-hydroxynaphthalene-3,6- or -4,6-disulphonic acid, 1-acetylamino-8-hydroxynaphthalene- 3,6- or -4,6-disulphonic acid, 1-(4'-aminobenzoylamino)- 8-hydroxynaphthalene-3,6-or -4,6-disulphonic acid, 1-(4'-nitrobenzoylamino)-8-hydroxynaphthalene- 3,6- or -4,6-disulphonic acid, 1-(3'-aminobenzoylamino)- 8-hydroxynaphthalene-3,6- or -4,6-disulphonic acid, 1-(3'-nitrobenzoylamino)-8-hydroxynaphthalene- 3,6- or -4,6-disulphonic acid and 1-amino-8-hydroxynaphthalene- 4-sulphonic acid.

The diazotization of the diazo components or of the intermediate products containing a diazotizable amino group is as a rule carried out by the action of nitrous acid in aqueous-mineral acid solution at a low temperature. The coupling to the coupling component is carried out at weakly acid, neutral to weakly alkaline pH values.

The condensation of the reactive components with the diazo components and the coupling components and with the amines or with acylatable monoazo or disazo intermediate products or with the dyestuffs containing amino groups is preferably carried out in aqueous solution or suspension, at a low temperature and at a weakly acid, neutral to weakly alkaline pH value. The hydrogen halide liberated during the condensation reaction is advantageously neutralized continuously by addition of aqueous alkali metal hydroxides, carbonates or bicarbonates.

The formulae stated are those of the free acids. The salts, in particular the alkali metal salts, such as sodium, potassium or lithium salts, are in general obtained during the preparation. The charge formed by quaternization with pyridines is compensated by a counter-ion, for example chloride, fluoride or sulphate, depending on the isolation conditions; alternatively, the dyestuffs form inner salts with sulpho or carboxyl groups. The dyestuffs can also be employed as concentrated solutions.

The reactive dyestuffs of the formula (I) are suitable for dyeing and printing naturally occurring or synthetic materials containing hydroxyl or amide groups, such as silk, leather, wool or synthetic polyamide fibres, but in particular cellulose-containing materials having a fibrous structure, such as linen, cellulose, regenerated cellulose and, above all, cotton. They are suitable both for the exhaustion process and for dyeing by the customary pad-dyeing processes, in which the goods are impregnated with aqueous dyestuff solutions, which also contain salts if appropriate, and, after treatment with alkali or in the presence of alkali, the dyestuffs are fixed, if appropriate under the action of heat.

The reactive dyestuffs of the formula (I) are distinguished by a high reactivity and excellent fixing capacity. Because of their trifunctionality, they produce high fixing yields even from a long liquor. They are characterized by the tinctorial power being relatively independent of the dyeing temperature, and can therefore be employed in the exhaustion process at low to moderate dyeing temperatures. In the pad-steam process, they require only short steaming times. They produce dyeings of good depth of colour with good light- and wetfastnesses.

The dyeings described in the following examples are carried out under the following conditions. Unless stated otherwise, percentages denote percentages by weight and parts denote parts by weight. The abbreviations used in the examples have the following meanings: Ph=phenyl, Et=ethyl, Me=methyl.

Dyeing instructions 1

2 parts of the dyestuff are dissolved in 100 ml of water. The solution is added to 1900 parts of cold water, 60 parts of sodium chloride are added and 100 parts of a cotton fabric are introduced into this dyebath.

The temperature is increased to 50° C., 40 parts of calcined soda and a further 60 parts of sodium chloride being added after 30 minutes. The temperature is kept at 50° C. for 30 minutes and the dyeing is rinsed and then soaped in a 0.3% strength boiling solution of an ion-free detergent for 15 minutes, rinsed and dried.

Dyeing instructions 2

4 parts of the reactive dyestuff are dissolved in 50 parts of water. 50 parts of a solution which contains 5 g of sodium hydroxide and 10 g of calcined soda per liter are added to this solution. A cotton fabric is padded with the resulting solution such that it increases by 70% of its weight, and is then wound up on a roll. The cotton fabric is kept thus at room temperature for 3 to 12 hours. The dyed goods are then rinsed, soaped at the boil with a nonionic detergent for a quarter of an hour, rinsed again and dried.

EXAMPLE 1

A) 0.15 mol of the compound of the formula

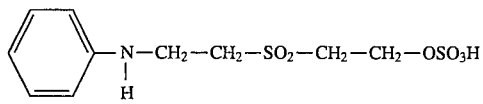

is stirred in 100 parts of water and 100 parts of ice and dissolved under neutral conditions. 0.165 mol of 2,4,6-trifluoro-1,3,5-triazine is added dropwise at 0° C. and pH 4–4.5 in the course of 10 minutes. About 250 parts of an aqueous condensation solution (solution A) of the condensation product having the following structure:

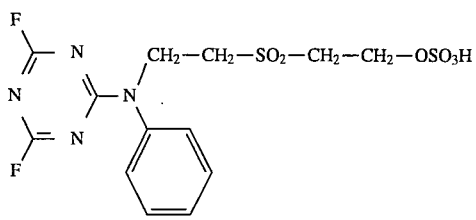

are obtained.

B) 0.13 mol of 2,4-diaminobenzenesulphonic acid is suspended in 150 ml of water and dissolved with soda solution at pH 7–8. This solution is added dropwise to the above condensation solution (solution A) at pH 6–6.5, during which the temperature rises to 15°–18° C. About 450 parts of an aqueous condensation solution (solution B) of the condensation product having the following structure

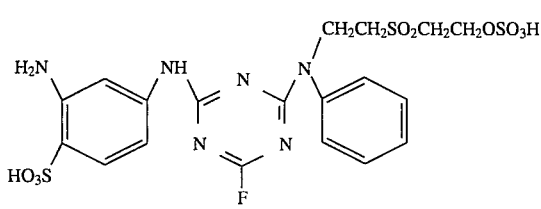

are obtained.

C) 0.15 mol of 1-amino-8-hydroxynaphthalene-3,6-disulphonic acid is dissolved in 250 ml of water at pH 6.5 and the solution is cooled to 0° C. with 250 g of ice. 0.16 mol of 2,4,6-trifluoro-1,3,5-triazine (cyanuric fluoride) is added and the pH is kept between 3.5 and 4 with $Na_2CO_3$ solution. After 5 minutes, 0.15 mol of morpholine is added and the pH is brought to 7 with soda solution. During this operation, the temperature rises to about 10° C.

D) The condensation product from B) (solution B) is diazotized at 0° C. and pH 3–3.5 and the diazotization product is added to the solution of coupling component C). A pH of 6–7 is established with soda solution.

When the coupling has ended, the dyestuff is salted out, isolated, dried and ground. The dyestuff thus obtained of the formula

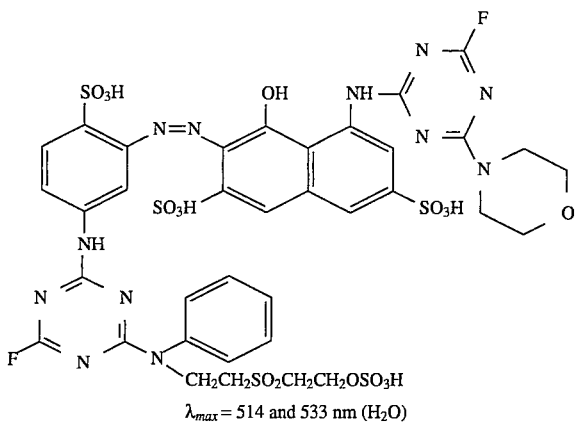

$\lambda_{max}$ = 514 and 533 nm ($H_2O$)

dyes cotton in clear red shades.

EXAMPLE 2

A) 0.15 mol of the compound of the formula

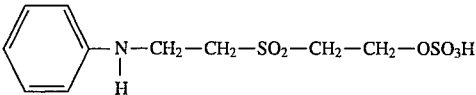

is stirred in 150 parts of water and 150 parts of ice and dissolved under neutral conditions. 0.155 mol of 2,4,6-trichloro-1,3,5-triazine is added dropwise at 0° C. and pH 5–5.5 in the course of 10 minutes. About 350 parts of an aqueous solution of the condensation product having the following structure:

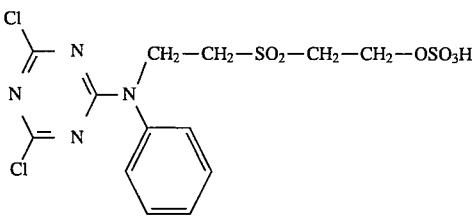

are obtained.

B) A neutral solution of 0.13 mol of 2,4-diaminobenzenesulphonic acid is added dropwise to this condensation solution, the pH being kept at 6.5–7.0 with soda solution. A diazo component of the structure:

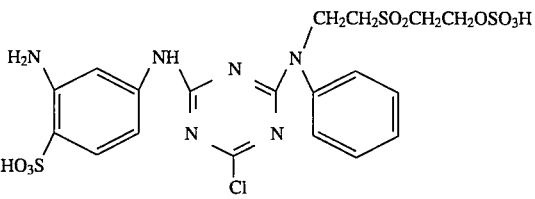

is obtained.

This diazo component is diazotized at 0° C. and pH 3–3.5 and the diazotization product is added to the solution of the coupling component from Example 1C, a pH of 6–7 being established and maintained with soda solution.

When the coupling has ended, the dyestuff is salted out with 15% of NaCl, isolated and dried. 141 g of salt-containing dyestuff of the formula

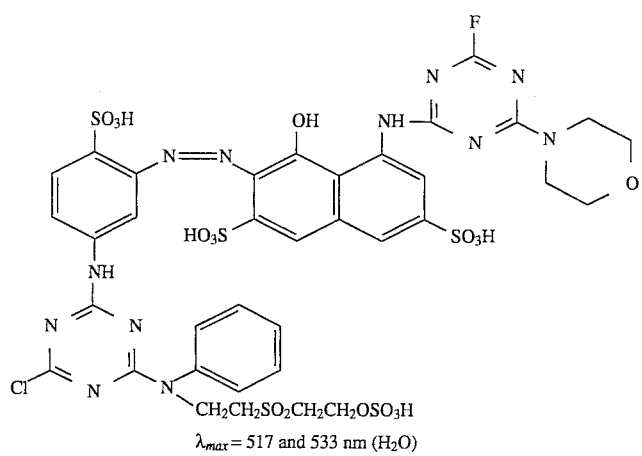

$\lambda_{max}$ = 517 and 533 nm (H$_2$O)

are obtained as a powder which dyes cotton in clear red shades.

EXAMPLE 3

A) 0.15 mol of 1-amino-8-hydroxynaphthalene-3,6-disulphonic acid is dissolved in 250 ml of water at pH 6.5 and the solution is cooled to 0°–5° C. with 200 g of ice. This solution is added to a suspension of 0.16 mol of 2,4,6-trichloro-1,3,5-triazine (cyanuric chloride) in 50 ml of water and 50 g of ice and the pH is kept at between 3.5 and 4 with NaHCO$_3$ solution. 0.15 mol of morpholine is then added and the pH is brought to 7 with soda solution.

B) 0.14 mol of a solution prepared by direct diazotization of the condensation product from Example 2B is added to this solution and coupling is carried out at pH 7–7.5. After salting out, isolating and drying, a salt-containing dyestuff to which the structure

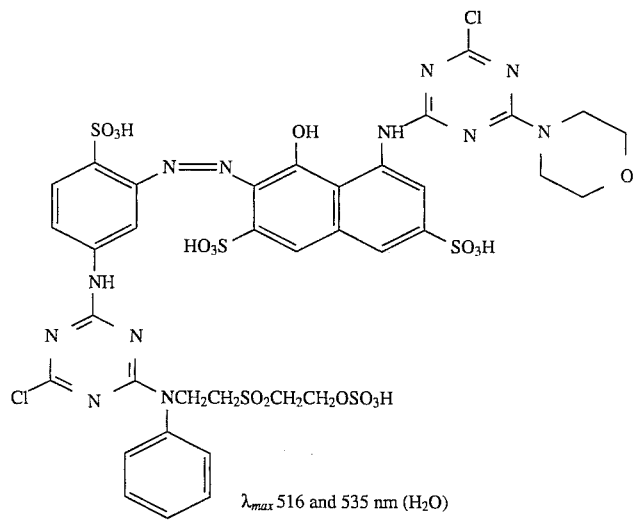

$\lambda_{max}$ 516 and 535 nm (H$_2$O)

is attributed, is obtained as a powder which dyes cotton in clear red colour shades.

The dyestuffs of the following Examples 4–45 can be prepared in an analogous manner using the diazo and coupling components and amines listed.

| Example | X | Diazo component | Coupling component | Z |
|---|---|---|---|---|
| 4 | (structure) | (structure) | (structure) | (structure) |
| 5 | (structure) | (structure) | " | (structure) |
| 6 | (structure) | (structure) | " | " |
| 7 | " | (structure) | " | (structure) |

-continued

| Example | X | Diazo component | Coupling component | Z |
|---|---|---|---|---|
| 8 | (structure with F-triazine, N(Ph), SO2, OSO3H) | 2,4-diamino benzene sulfonic acid (SO3H, NH2, NH-X) | 1-amino-8-hydroxy naphthalene-3,6-disulfonic acid derivative (NH-Z, SO3H, OH, HO3S) | chloro-triazine with m-sulfophenylamino (SO3H) |
| 9 | " | 2,4-diamino benzene sulfonic acid | 4-NH-Z-4'-NH-CO-anilide naphthol disulfonic acid structure | chloro-triazine with m-sulfophenylamino (SO3H) |
| 10 | (F-triazine, NH, SO2, (CH2)4, OSO3H) | 2,4-diamino benzene sulfonic acid | 1-amino-8-hydroxy naphthalene-3,6-disulfonic acid derivative | fluoro-triazine with morpholino |
| 11 | (Cl-triazine, N(Ph), SO2, OSO3H) | 2,4-diamino benzene sulfonic acid | 1-amino-8-hydroxy naphthalene-3,6-disulfonic acid (H-acid) type | fluoro-triazine with N(C2H5)(Ph) |

-continued

| Example | X | Diazo component | Coupling component | Z |
|---|---|---|---|---|
| 12 | | | | |
| 13 | | | " | |
| 14 | | | " | |
| 15 | | | " | |

| Example | X | Diazo component | Coupling component | Z |
|---|---|---|---|---|
| 16 | 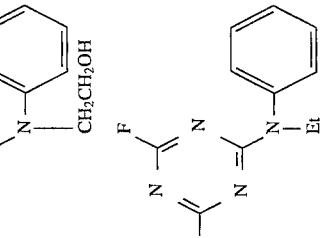 | | 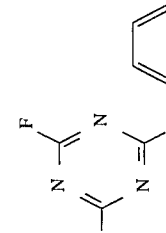 | 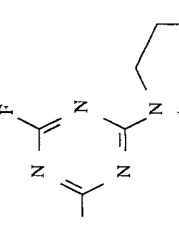 |
| 17 | 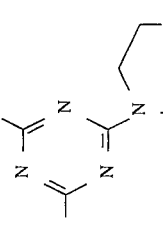 | 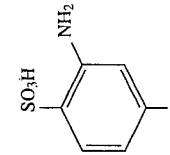 |  |  |
| 18 | 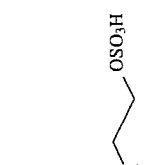 | " | " | 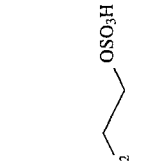 |
| 19 |  | " | " | |

| Example | X | Diazo component | Coupling component | Z |
|---|---|---|---|---|
| 20 | 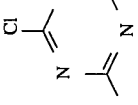 | 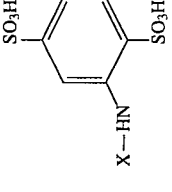 | 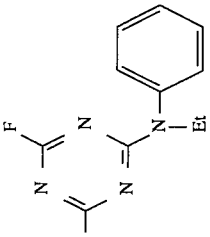 |  |
| 21 | " |  | |  |
| 22 | " | 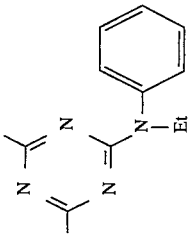 | | 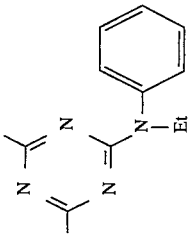 |
| 23 | 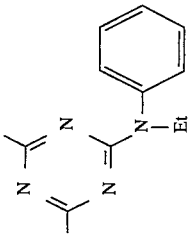 |  |  | 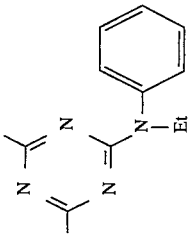 |

-continued
| Example | X | Diazo component | Coupling component | Z |
|---|---|---|---|---|
| 24 | 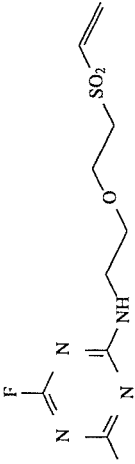 | 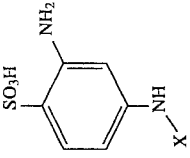 | 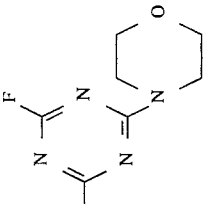 | 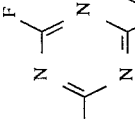 |
| 25 | 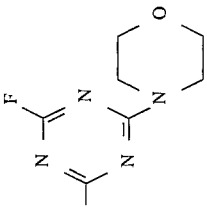 | 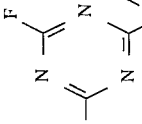 | " | " |
| 26 | 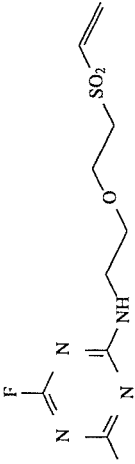 | 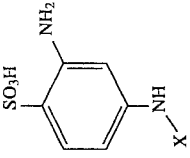 | " | 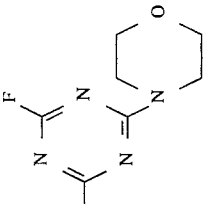 |
| 27 | 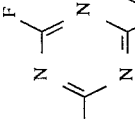 | 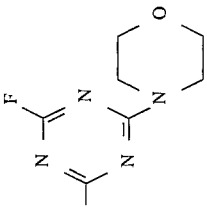 | " | 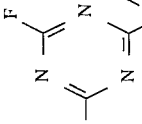 |

| Example | X | Diazo component | Coupling component | Z |
|---|---|---|---|---|
| 28 | (structure with OSO3H-CH2CH2-SO2-CH2CH2-N(Ph)-triazine-Cl) | 3-amino-4-sulfo-aniline with NH-X | naphthol with OH, CH3, two SO3H, NH-Z | " |
| 29 | (structure with OSO3H-CH2CH2-SO2-CH2CH2-N(Ph)-triazine-F) | 3-amino-4-sulfo-aniline with NH-X | p-aminophenyl-NH-CO-naphthol(OH, two SO3H)-NH-Z | fluoro-triazine-morpholino |
| 30 | " | 2-amino-4-(N-CH3)-benzene sulfonic acid with X-N(CH3)- | " | fluoro-triazine-N(CH3)-phenyl |
| 31 | " | 2-amino-5-(NH-X)-benzene with SO3H | naphthol with OH, CH3, SO3H, NH-Z | fluoro-triazine-morpholino |

-continued
| Example | X | Diazo component | Coupling component | Z |
|---|---|---|---|---|
| 32 |  | 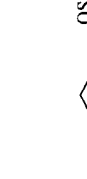 | 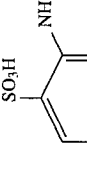 | 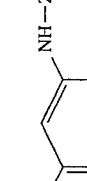 |
| 33 | " | 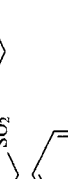 | 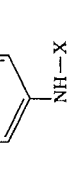 | 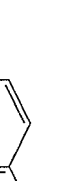 |
| 34 | " |  |  |  |
| 35 |  |  | 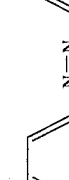 | 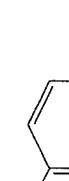 |

| Example | Diazo component | Coupling component | X | Z |
|---|---|---|---|---|
| 36 | 2-amino-4-(NH-X)-benzenesulfonic acid (SO₃H, NH₂, NH-X on benzene) | 2-amino-5-hydroxy-7-methyl-8-sulfo-naphthalene with SO₃H and NH-Z | " | Fluoro-s-triazine with morpholine substituent |
| 37 | 2-amino-4-(NHX)-benzenesulfonic acid | 4-amino-5-hydroxy-7-methyl-6-sulfo-naphthalene-2-sulfonic acid with NH-Z | $-CH_2CH_2-SO_2-CH_2CH_2-OSO_3H$ attached via N-phenyl to chloro-s-triazine with isopropylidene | Chloro-s-triazine with N(C₆H₅)(C₂H₅) |
| 38 | 2-amino-4-(NHX)-benzenesulfonic acid | 5-amino-8-hydroxy... naphthalene with two SO₃H, CH₃ and NH-Z | $-CH_2CH_2-SO_2-CH_2CH_2-OSO_3H$ attached via N-phenyl to chloro-s-triazine with isopropylidene | Chloro-s-triazine with N(C₆H₅)(C₂H₅) |
| 39 | " | " | " | Chloro-s-triazine with morpholine substituent |

-continued
| Example | X | Diazo component | Coupling component | Z |
|---|---|---|---|---|
| 40 | 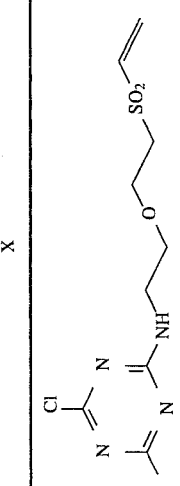 | 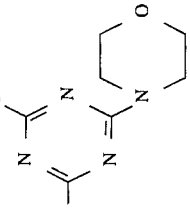 | 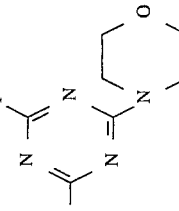 | 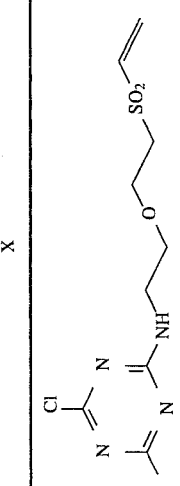 |
| 41 | 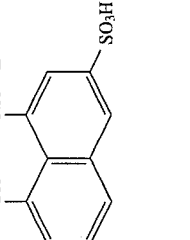 | 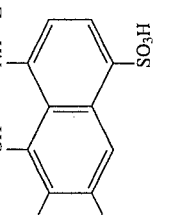 | 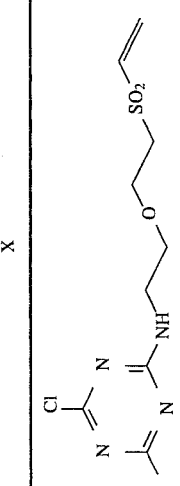 | 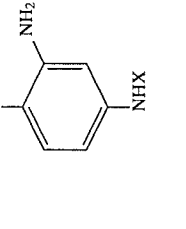 |
| 42 | 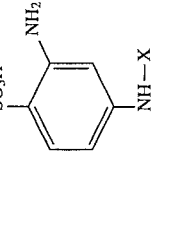 | " | 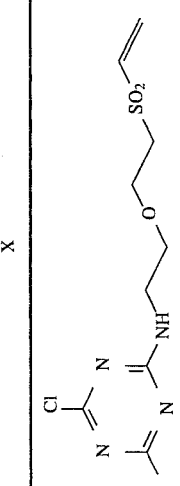 | 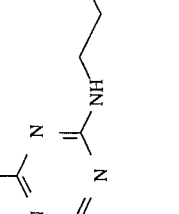 |
| 43 | 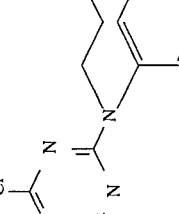 | 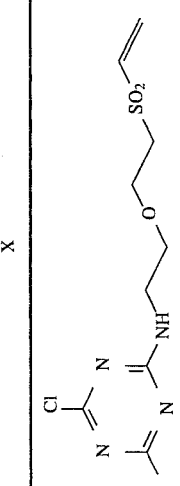 | 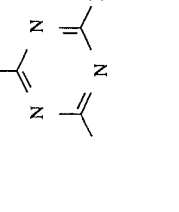 | 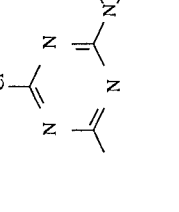 |

| Example | X | Diazo component | Coupling component | Z |
|---|---|---|---|---|
| 44 | (pyrimidine with F, CH₃, N-phenyl-N-(CH₂CH₂SO₂CH₂CH₂OSO₃H)) | 4-sulfophenyl-azo-(2-SO₃H, 4-NH₂, 5-NH-X benzene) | 1-hydroxy-2-methyl-3-sulfo-6-(NH-Z)-naphthalene | (pyrimidine with Cl, CH₃, NH-CH₂CH₂SO₃H) |
| 45 | (pyrimidine with Cl, CH₃, N-phenyl-N-(CH₂CH₂SO₂CH₂CH₂OSO₃H)) | 1-SO₃H, 2-NH₂, 4-NH-X benzene | 1-hydroxy-2-methyl-3-sulfo-6-(N(CH₃)-Z)-naphthalene | (pyrimidine with F, CH₃, NH-CH₂CH₂SO₃H) |

EXAMPLE 46

0.2 mol of 1-amino-8-hydroxynaphthalene-3,6-disulphonic acid are dissolved in 450 ml of water with sodium hydroxide solution at pH 8–9 and 0.22 mol of 2,4,6-trifluoropyrimidine is added. The condensation reaction is carried out at 35°–40° C., the pH being kept at 4.0–5.0 with soda solution.

If the product is coupled with the diazonium salt from Example 1B, salting out, isolation and drying gives the dyestuff of the formula

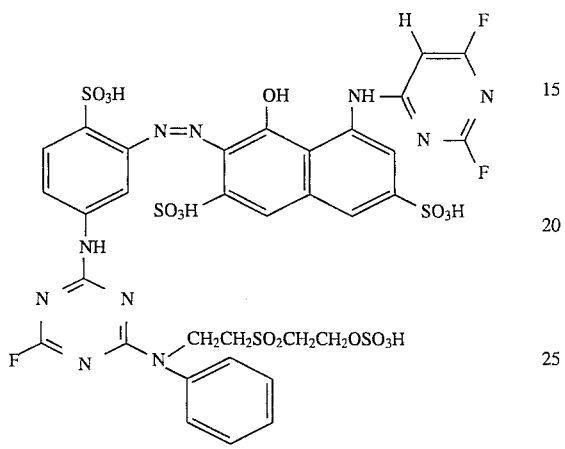

which dyes cotton in red shades.

EXAMPLE 47

0.2 mol of 8-(4'-amino-benzoylamino)-1-naphthol-3,6-disulphonic acid is dissolved in 800 ml of water with soda solution (20 g/100 ml) at a pH of 7. The pH is brought to 4.5 with 10% strength HCl solution. 0.2 mol of 2,4,6-trifluoropyrimidine is added and the mixture is heated to 30° C. A pH of 4.5–6 is maintained with soda solution (20 g/100 ml). The reaction has ended after 4 hours.

0.2 mol of the diazonium salt from Example 1 is now added, and at the same time a pH of 7.5–8 is maintained by dropwise addition of soda solution (20 g/100 ml). When the coupling has ended, the product is salted out with NaCl, isolated and dried. The dyestuff of the formula

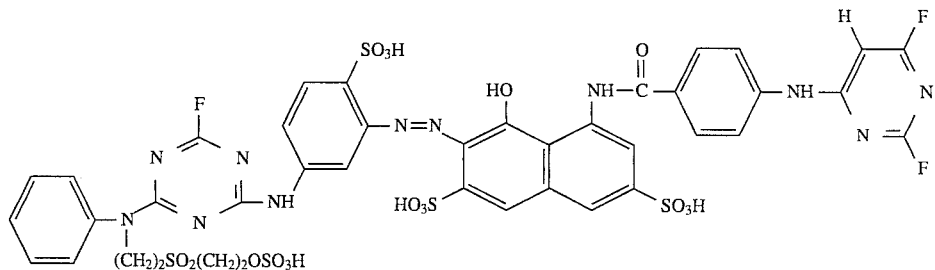

dyes cotton in red shades.

Examples 48–77 can be prepared as described in Example 46 or 47, respectively, if the corresponding intermediate products are employed.

| Example | Z | Coupling component | Diazo component | X |
|---|---|---|---|---|
| 48 | pyrimidine with F, Cl, CH₃ | 8-OH, 5-NH-Z, 3,7-di-SO₃H naphthalene | 2-amino-4-(X-NH)-5-methyl-benzenesulfonic acid (SO₃H, NH₂, CH₃, X—NH) | 2-chloro-4-[N-phenyl-N-(2-sulfatoethylsulfonylethyl)amino]-1,3,5-triazine (Cl, OSO₃H, SO₂, N-phenyl, triazine) |
| 49 | pyrimidine with F, Cl, CH₃ | 8-OH, 5-NH-Z, 3,7-di-SO₃H naphthalene | 4-amino-3-(X-NH)-benzenesulfonic acid (SO₃H, NH₂, X—NH) | " |
| 50 | " | " | 2-amino-4-[X-N(CH₃)CH₂]-benzenesulfonic acid (SO₃H, NH₂, X—N(CH₃)—CH₂) | 2-fluoro-4-[N-phenyl-N-(2-sulfatoethylsulfonylethyl)amino]-1,3,5-triazine (F, OSO₃H, SO₂, N-phenyl, triazine) |
| 51 | pyrimidine with F, Cl, CH₃ | 8-OH, 5-NH-Z, 3,7-di-SO₃H naphthalene | 2-amino-1-SO₃H-5-(X—HN—CH₂)-naphthalene (NH₂, SO₃H, X—HN—CH₂) | 2-fluoro-4-[N-phenyl-N-(2-sulfatoethylsulfonylethyl)amino]-1,3,5-triazine (F, OSO₃H, SO₂, N-phenyl, triazine) |

-continued

| Example | X | Diazo component | Coupling component | Z |
|---|---|---|---|---|
| 52 | " | SO₃H-C₆H₃(NH₂)-CH₂-N(CH₃)-X | 8-amino-1-naphthol-3,6-disulfonic acid derivative (NH-Z, OH, SO₃H, SO₃H, CH₃) | fluorochloropyrimidine |
| 53 | " | 2-amino-8-(X-HN-CH₂)-naphthalene-1,5-disulfonic acid | same coupling component | fluorochloropyrimidine |
| 54 | Ph-N(CH₂CH₂SO₂CH₂CH₂OSO₃H)-C(=N-)(Cl)- triazine with isopropyl | 2,4-diamino-benzene-1,5-disulfonic acid (X-HN-, NH₂, SO₃H, SO₃H) | same coupling component | fluorochloropyrimidine |
| 55 | Ph-N(CH₂CH₂CH₂SO₂CH₂CH₂OSO₃H)-C(=N-)(F)- triazine with isopropyl | SO₃H-C₆H₃(NH₂)-NH-X | same coupling component | fluorochloropyrimidine |

| Example | X | Diazo component | Coupling component | Z |
|---|---|---|---|---|
| 56 | chloro-triazine with N-phenethyl-OSO3H group | 2,4-diamino-benzenesulfonic acid coupled azo with 4-sulfophenyl | 1-hydroxy-2-methyl-6-amino-naphthalene-3-sulfonic acid with NH-Z | " |
| 57 | fluoro-triazine with N-phenethyl-OSO3H group | 2-amino-benzenesulfonic acid with N(CH3)-X | 1-hydroxy-2-methyl-6-amino-naphthalene-3-sulfonic acid with NH-Z | fluoro-chloro pyrimidine (F, Cl, F substituents) |
| 58 | chloro-triazine with N-(3-methylphenyl)ethyl-OSO3H group | 4-amino-1,3-benzenedisulfonic acid with X-HN | 1-hydroxy-2-methyl-6-amino-naphthalene-3-sulfonic acid with NH-Z | fluoro-chloro pyrimidine |
| 59 | fluoro-triazine with N-phenethyl-OSO3H group | 2-amino-benzenesulfonic acid with X-NH | 1-hydroxy-2-methyl-6-amino-naphthalene-3-sulfonic acid with NH-Z | dichloro pyrimidine |

5,541,300
| Example | X | Diazo component | Coupling component | Z |
|---|---|---|---|---|
| 60 | 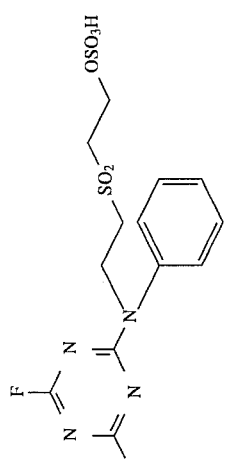 | 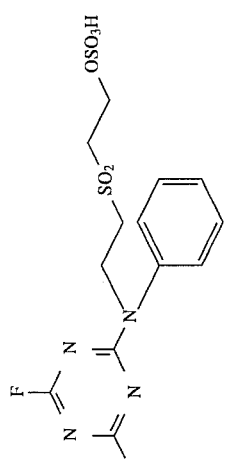 | 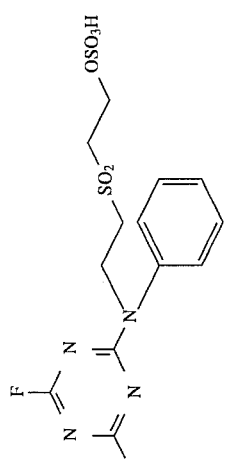 | 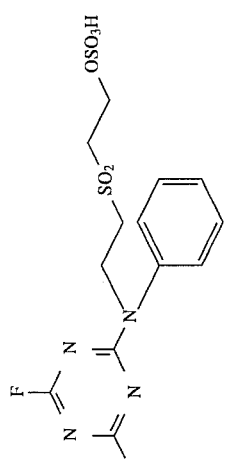 |
| 61 | 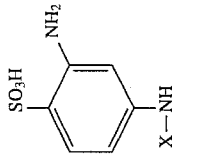 | 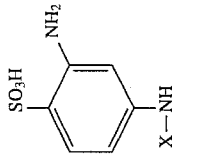 | 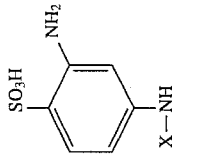 | 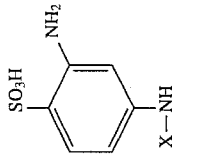 |
| 62 | 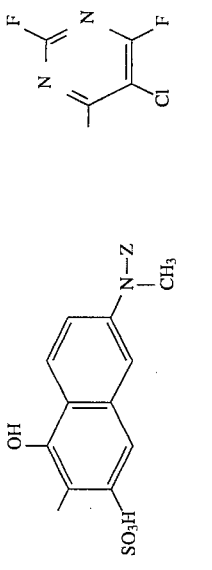 | 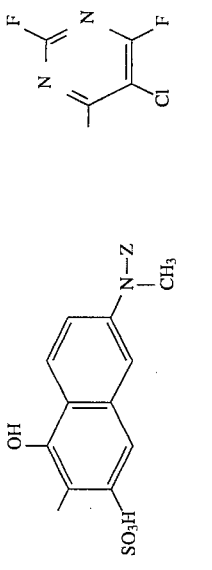 | 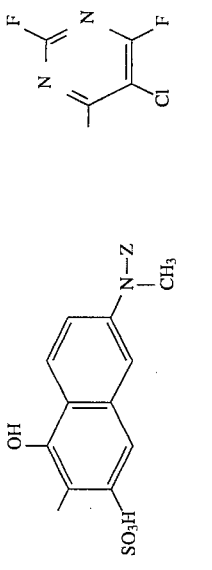 | " |
| 63 | 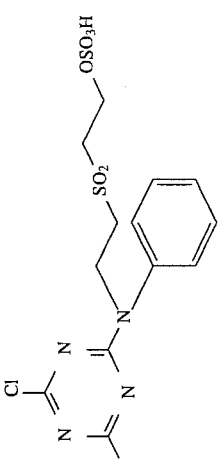 | 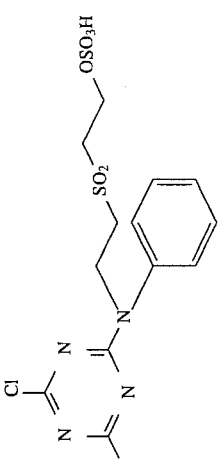 | 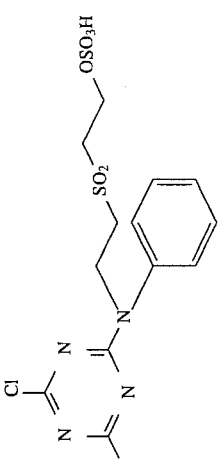 | 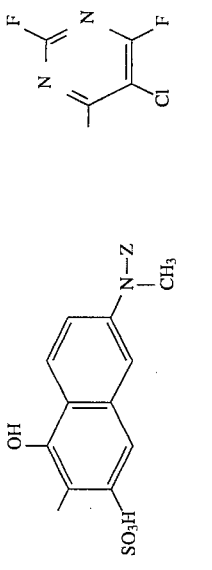 |

-continued
| Example | X | Diazo component | Coupling component | Z |
|---|---|---|---|---|
| 64 | 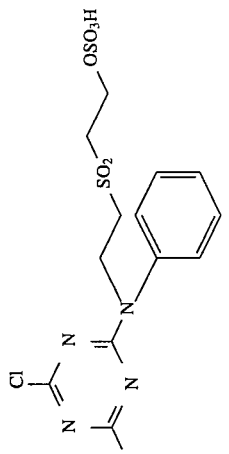 | 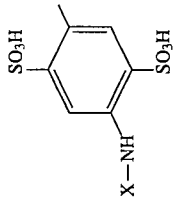 | 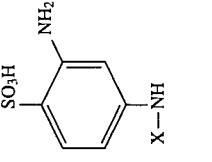 | 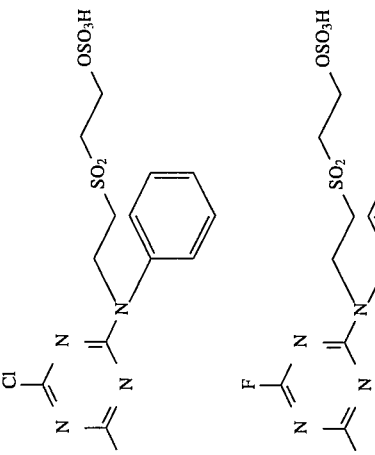 |
| 65 | 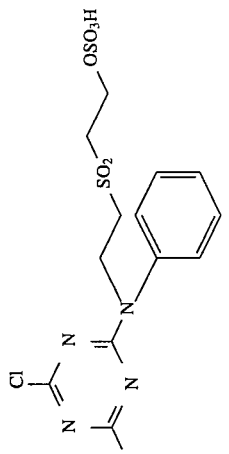 | 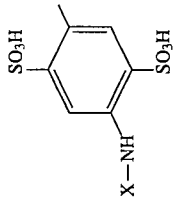 | 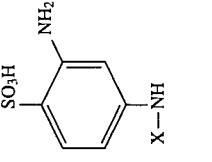 | 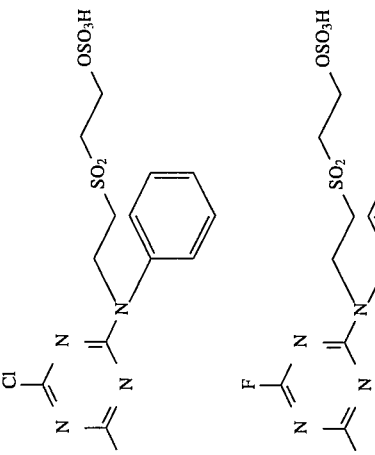 |
| 66 | 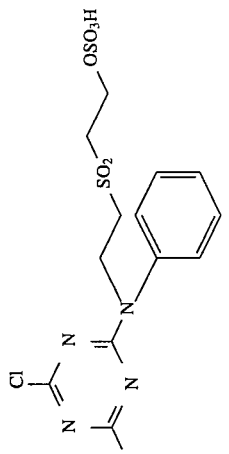 | 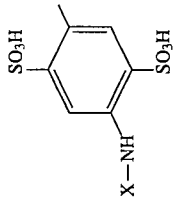 | 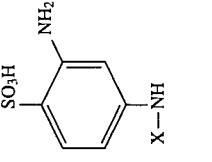 | 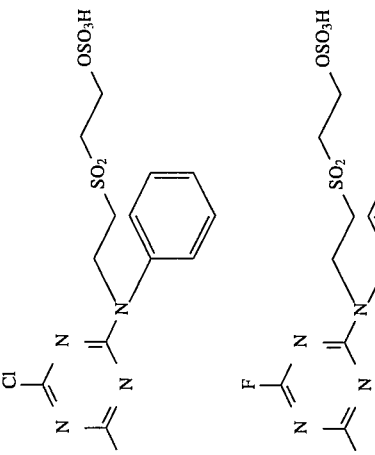 |
| 67 | 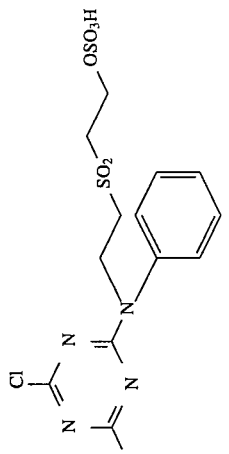 | 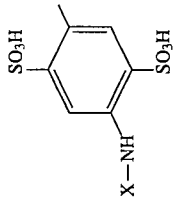 | 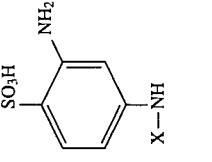 | 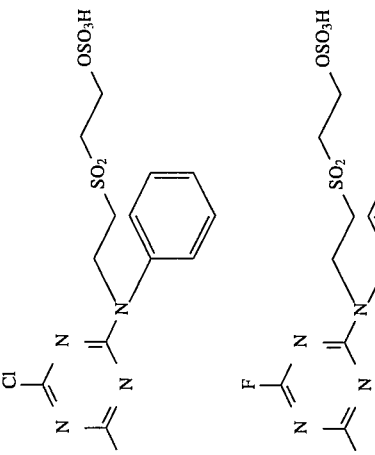 |

-continued
| Example | X | Diazo component | Coupling component | Z |
|---|---|---|---|---|
| 68 | 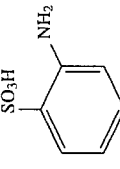 | 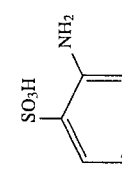 | " | " |
| 69 |  |  |  |  |
| 70 | 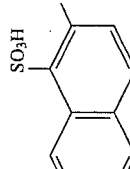 | 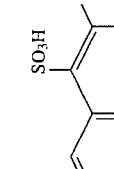 |  |  |
| 71 |  |  | " | " |

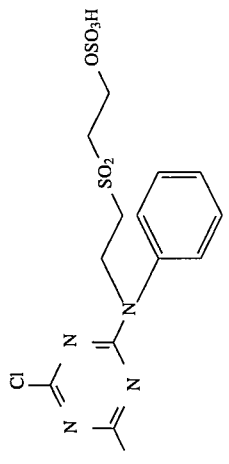

-continued

| X | Diazo component | Coupling component | Z | Example |
|---|---|---|---|---|
| " | SO₃H, NH₂, X—NH (on benzene) | OH, SO₃H, CH₃, NH—Z (on naphthalene) | " | 77 |

EXAMPLE 78

0.2 mol of 1-amino-8-hydroxynaphthalene-3,6-disulphonic acid is dissolved in 650 ml of water with sodium hydroxide solution at pH 6.5 and the solution is heated to 35° C. 0.21 mol of 2,3-dichloroquinoxaline-6-carbonyl chloride is added to this solution, the pH is brought to 6–7 with soda solution and the condensation reaction is carried out at 35° C. for about 6 hours.

Analogously to Example 1, the compound from Example 1B is diazotized and the diazotization product is reacted with the above coupling solution.

The dyestuff is salted out, isolated, dried and ground. It has the following structure

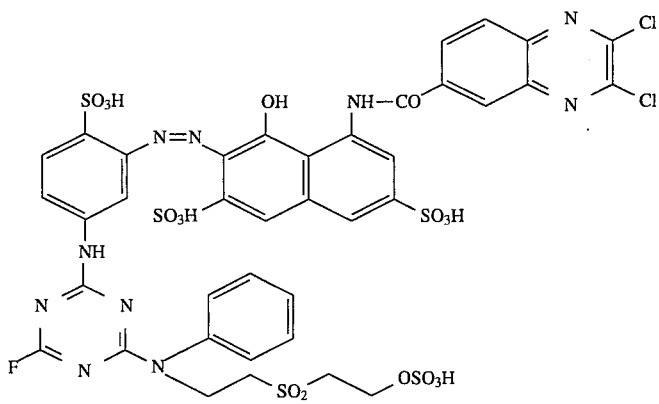

and dyes cotton in red shades.

The dyestuffs of Examples 79–89 can be prepared as described above with the diazo and coupling components listed, wherein Z = 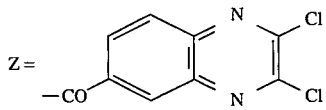

and X has the meaning given in each case.

| Example | Coupling component | Diazo component | X |
|---|---|---|---|
| 79 | (naphthalene with OH, NH–Z, SO₃H, HO₃S, CH₃) | aniline with NH₂, SO₃H, X–NH | triazine with F, N-Ph, (CH₂)₂SO₂(CH₂)₂OSO₃H, isopropyl |
| 80 | " | aniline with NH₂, SO₃H, X–N(CH₃)CH₂– | " |
| 81 | " | benzene with NH₂, SO₃H (×2), X–HN | triazine with Cl, N-Ph, (CH₂)₂SO₂(CH₂)₂OSO₃H, isopropyl |
| 82 | (naphthalene with OH, NH–Z, SO₃H, HO₃S, CH₃) | aniline with NH₂, SO₃H, X–NH | " |
| 83 | (naphthalene with OH, N–Z, SO₃H, SO₃H) | aniline with NH₂, SO₃H, X–N(CH₃)CH₂– | " |

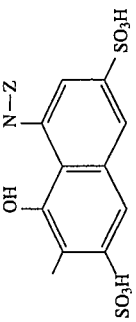

-continued

| X | Diazo component | Coupling component | Example |
|---|---|---|---|
| ![X structure: chloro-triazine with N(Ph)-CH2CH2-SO2-CH2CH2-OSO3H] | ![Diazo: benzene with SO3H, NH2, X—NH substituents] | ![Coupling: naphthalene with OH, SO3H, CH3, and N(Z)(CH3) substituents] | 89 |

EXAMPLE 90 a) 0.3 mol of the compound of the formula

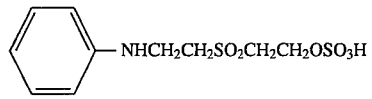

is stirred in 300 parts of water and 200 parts of ice. The pH is brought to 6–7 by addition of sodium bicarbonate.

This solution is added to a suspension of 0.3 mol of cyanuric chloride, 150 parts of water and 100 g of ice, the pH being kept at 5–6 with soda solution (20% strength). A temperature of 0°–1° C. is maintained by addition of ice in portions. After two hours, the reaction has ended and the condensation product has precipitated completely.

This suspension is added to a solution of 0.2 mol of 1-amino-8-hydroxy-3,6-naphthalenedisulphonic acid in 500 ml of water (brought to pH 5.5–6 with lithium hydroxide solution (10% strength)). The mixture is heated to 40° C. and kept at a constant pH =4.5 by addition of soda solution (20% strength). The reaction has ended after stirring for two hours.

b) 0.2 mol of 3-aminobenzenesulphonic acid is dissolved in 280 ml of water with lithium hydroxide at pH 7 and 250 g of ice are added. Thereafter, 0.21 mol of cyanuric fluoride is added and the pH is kept at about 4 with soda solution. A neutral solution of 2,4-diaminobenzenesulphonic acid is added to the suspension thus formed, and the pH is increased to 7–7.5. The reaction temperature is increased to 20° C. and the mixture is stirred for about 1 hour. The reaction mixture is cooled to 0° C. and diazotization is carried out with HCl and sodium nitrite solution at pH 2–2.2. After the excess nitrite has been destroyed with amidosulphonic acid, the product is coupled to the above condensation solution a) at pH 5–6 and 10°–15° C. Salting out, isolation and drying gives the dyestuff of the formula

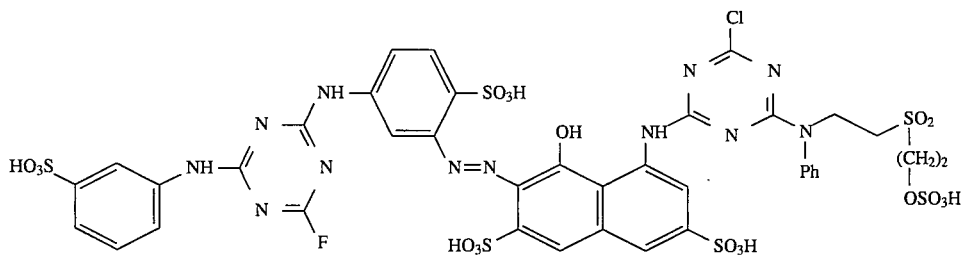

which dyes cotton in red shades.

The dyestuffs of Examples 91–102 can be prepared in an analogous manner using the diazo and coupling components shown.

In some cases, however, it is more favourable first to synthesize the X-containing azochromophore and then to condense on the reactive components (Z).

| Example | Diazo component | Coupling component | Z | X |
|---|---|---|---|---|
| 91 | (structure) | (structure) | (structure) | (structure) |
| 92 | (structure) | " | " | " |
| 93 | (structure) | " | (structure) | " |
| 94 | (structure) | (structure) | (structure) | (structure) |

-continued

| Example | Diazo component | Coupling component | Z | X |
|---|---|---|---|---|
| 95 | 2-amino-4-(Z-NH)-benzenesulfonic acid (SO₃H, NH₂, Z—NH on benzene) | naphthalene with NH—CO—(phenyl-NH—X), OH, CH₃, SO₃H substituents | " | " |
| 96 | 3-amino-4-(Z—N(CH₃)—CH₂)-benzenesulfonic acid | " | triazine with F, isopropylidene, N(Et)(phenyl) | " |
| 97 | 2-amino-4-(Z—NH)-benzenesulfonic acid | 8-(NH—X)-1-OH-naphthalene-3,6-disulfonic acid | triazine with F, isopropylidene, N-morpholino | " |
| 98 | 4-amino-benzene-1,3-disulfonic acid with Z—NH at position 5 | 8-(NH—X)-1-OH-naphthalene-3,6-disulfonic acid | triazine with F, isopropylidene, NH—(2-OCH₃-5-SO₃H-phenyl) | phenyl—SO₂—CH₂CH₂—OSO₃H |

-continued

| Example | Diazo component | Coupling component | Z | X |
|---|---|---|---|---|
| 99 | 2-amino-4-(N-methyl-N-CH₂-Z)-benzenesulfonic acid | 4-hydroxy-3-methyl-6-(NH-X)-naphthalene-2-sulfonic acid | 3-sulfophenylamino-difluorotriazinyl | N-phenyl-N-(2-(2-sulfatoethylsulfonyl)ethyl)-chloromethyltriazinyl |
| 100 | 2-amino-4-(CH₂-N(CH₃)-Z)-benzenesulfonic acid | " | " | " |
| 101 | 2-amino-4-(NH-Z)-benzenesulfonic acid | " | 2-methoxy-5-sulfophenylamino-fluorotriazinyl | " |
| 102 | 2-amino-4-(NH-Z)-benzenesulfonic acid | " | " | " |

EXAMPLE 103

0.22 mol of N-ethylaniline is dissolved in 200 ml of water at pH 7. 200 g of ice are added and 0.24 mol of cyanuric chloride are sprinkled in. A pH of 6–7 is maintained with soda solution (20 g/100 ml). After about 1 hour at 0° C., the condensation reaction has ended. 0.2 mol of 2,4-diaminobenzenesulphonic acid is dissolved in 250 ml of water by addition of concentrated sodium hydroxide solution and the solution is added to the 1st stage of the condensation. A pH of 6–7 is maintained with soda solution (20 g/100 ml). The mixture is heated to 25°–35° C. When the condensation has ended, the mixture is cooled to 0° C. 56 ml of 30% strength hydrochloric acid are added. 47 ml of sodium nitrite solution (30 g/100 ml) are added dropwise and the mixture is stirred at 0° C. for 1 hour. The sodium nitrite is destroyed with amidosulphonic acid and the diazotization product thus obtained is added to the coupling component from Example 90. A pH of 7–8 is maintained with soda solution (20 g/ 100 ml). T=10°–15° C. When the coupling has ended, the product is salted out with NaCl, isolated and dried. The resulting dyestuff of the formula

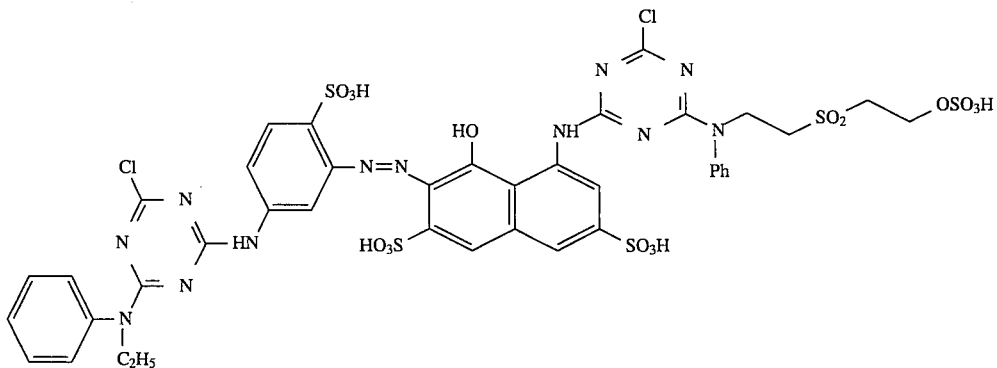

dyes cotton in red shades.

The dyestuffs of Examples 104–109 can be prepared analogously using the corresponding diazo and coupling components and amines. In some cases, it is more favourable to carry out the condensation with cyanuric chloride and amine at the end of the synthesis sequence.

| Example | Diazo component | Coupling component | Z | X |
|---|---|---|---|---|
| 104 | 3-amino-benzene with SO₃H, SO₃H and Z—NH substituents | 8-amino-1-naphthol-3,6-disulfonic acid derivative with NH—X, SO₃H, HO₃S, OH substituents | chlorotriazine with NH-(4-chlorophenyl) and isopropylidene-N | phenyl-N(CH₂CH₂SO₂CH₂CH₂OSO₃H)-chlorotriazine |
| 105 | aniline with NH₂, SO₃H, CH₃O, CH₂—NH—Z | " | chlorotriazine with N(CH₃)(phenyl) | phenyl-N(CH₂CH₂SO₂CH₂CH₂OSO₃H)-chlorotriazine |
| 106 | naphthalene-1-sulfonic acid with NH₂ and CH₂—NH—Z | " | chlorotriazine with NH-(2,5-disulfophenyl) | phenyl-N(CH₂CH₂SO₂CH₂CH₂OSO₃H)-chlorotriazine |
| 107 | benzene with NH₂, SO₃H, NH—Z | 8-amino-1-naphthol with NH—CO—C₆H₄—NH—X, OH, SO₃H substituents | chlorotriazine with NH-(2,5-disulfophenyl) | fluorotriazine with N(phenyl)(CH₂CH₂SO₂CH₂CH₂OSO₃H) |

-continued

| Example | Diazo component | Coupling component | Z | X |
|---|---|---|---|---|
| 108 | 2-amino-4-(N-methyl-N-Z-aminomethyl)benzenesulfonic acid | " | 2-(2',5'-disulfophenylamino)-4-chloro-6-methyl-1,3,5-triazine | " |
| 109 | 2-amino-4-(N-methyl-N-Z-aminomethyl)benzenesulfonic acid | 1-hydroxy-2-methyl-6-(NH–X)-3-sulfonaphthalene | 2-(2',5'-disulfophenylamino)-4-chloro-6-methyl-1,3,5-triazine | 2-(N-phenyl-N-(β-sulfatoethylsulfonylethyl)amino)-4-chloro-6-methyl-1,3,5-triazine |

EXAMPLE 110

0.2 mol of 6-fluoro-5-chloro-4-(3'-amino-4'-sulphophenyl)-amino-pyrimidine (prepared from 2,4-diaminobenzenesulphonic acid and 4,6-difluoro-5-chloropyrimidine) is suspended in water, and 65 ml of 30% strength hydrochloric acid and 300 g of ice are added. Thereafter, 46 ml of 30% strength sodium nitrite solution are added and the mixture is stirred at 0° C. for 1 hour. Excess sodium nitrite is destroyed with amidosulphonic acid and the diazotization product thus obtained is added to the solution of the coupling component from Example 90. A pH of 7–8 is maintained with soda solution (20 g/100 ml). T=10°–15° C. When the coupling has ended, the product is salted out with NaCl, isolated and dried. The resulting dyestuff of the formula

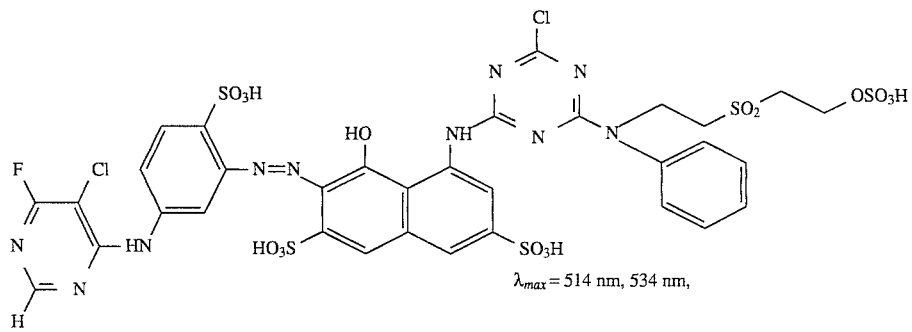

$\lambda_{max}$ = 514 nm, 534 nm, dyes cotton in red shades.

The dyestuffs of Examples 111–128 of the general formula

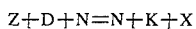

Z+D+N=N+K+X can be prepared analogously using the corresponding diazo and coupling components and amines.

| Example | Diazo component | Coupling component | Z | X |
|---|---|---|---|---|
| 111 | 4-amino-3-sulfo-phenyl with Z—NH at position 5 (SO₃H, NH₂, Z—NH substituted benzene) | 8-amino-1-hydroxy-naphthalene-3,6-disulfonic acid with NH—X | chloro-fluoro-methyl-pyrimidine (with H) | 2,4-disubstituted pyrimidine: Cl and N(phenyl)(CH₂CH₂SO₂CH₂CH₂OSO₃H), with CH₃ |
| 112 | 2-amino-1-sulfo-4-(N-methyl-N-Z-aminomethyl)-benzene | " | chloro-fluoro-methyl-pyrimidine (with F) | " |
| 113 | 2-amino-1-sulfo-5-(Z-HN-CH₂)-naphthalene | 8-amino-1-hydroxy-naphthalene-3,6-disulfonic acid with NH—X | " | " |
| 114 | 5-amino-2,4-disulfo-1-(Z-HN)-benzene | 8-amino-1-hydroxy-naphthalene-4,6-disulfonic acid with NH—X, OH, SO₃H, CH₃ | fluoro-methyl-pyrimidine (with F) | " |
| 115 | 2-amino-1-sulfo-4-(Z-NH)-benzene | 8-amino-1-hydroxy-naphthalene-4,6-disulfonic acid with NH—X, OH, SO₃H, CH₃ | " | 2,4-disubstituted pyrimidine: Cl and N(phenyl)(CH₂CH₂SO₂CH₂CH₂OSO₃H), with CH₃ |

-continued

| Example | Diazo component | Coupling component | Z | X |
|---|---|---|---|---|
| 116 | 3-amino-4-sulfo-phenyl-CH₂-N(CH₃)-Z with NH₂ | (same as below) | 5-chloro-6-methyl-4-fluoro-pyrimidin-2-yl | 4-[N-phenyl-N-(2-sulfatoethylsulfonyl-ethyl)]amino-6-chloro-triazin-2-yl (isopropylamino) |
| 117 | 2-amino-1-sulfo-4-(Z-NH)-benzene | 8-(NH-X)-1-hydroxy-7-methyl-naphthalene-3,6-disulfonic acid | 2,3-difluoro-5-methyl-pyridin-... | 4-[N-phenyl-N-(2-sulfatoethylsulfonyl-ethyl)]amino-6-fluoro-triazin-2-yl (isopropylamino) |
| 118 | 4-amino-1,3,5-(SO₃H, SO₃H, Z-NH)-benzene | 8-(NH-X)-1-hydroxy-7-methyl-naphthalene-3,6-disulfonic acid | 5-chloro-6-methyl-4-fluoro-pyrimidin-2-yl | 4-[N-phenyl-N-(2-hydroxyethylsulfonyl-ethyl)]amino-6-chloro-triazin-2-yl (isopropylamino) |
| 119 | 3-amino-4-sulfo-phenyl-CH₂-N(CH₃)-Z | " | " | " |

-continued
| Example | Diazo component | Coupling component | Z | X |
|---|---|---|---|---|
| 120 | 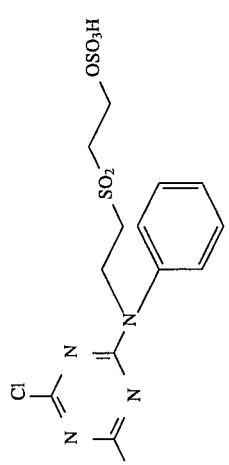 | 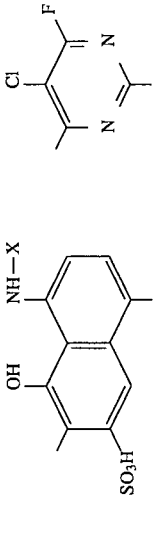 | 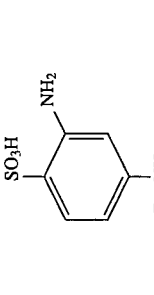 | 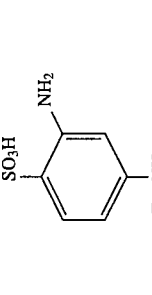 |
| 121 | 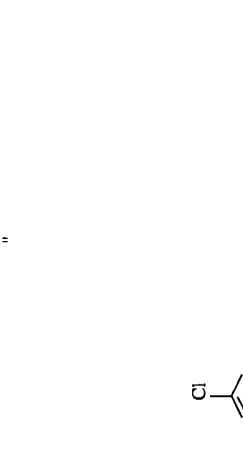 | 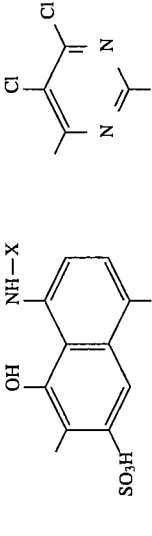 | 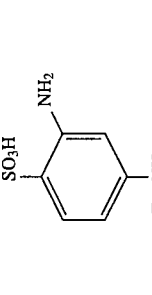 | = |
| 122 | 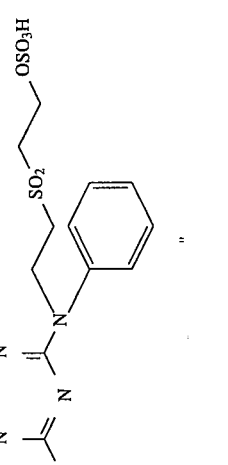 | 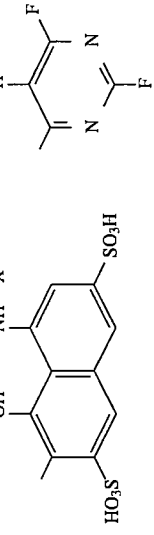 | 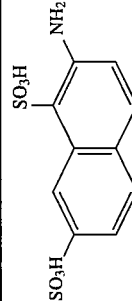 | = |
| 123 | 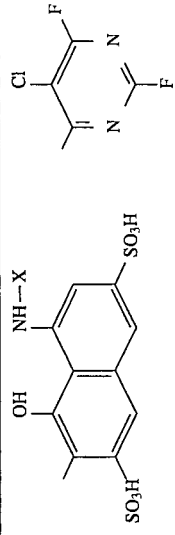 | 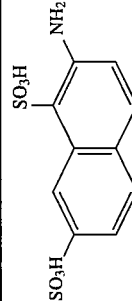 | 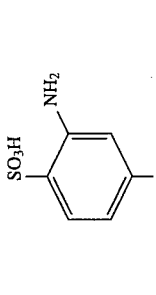 | 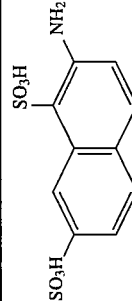 |
| 124 | 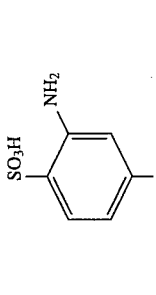 | | 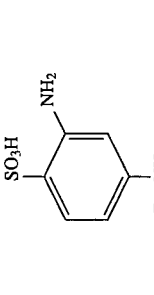 | = |

-continued

| Example | Diazo component | Coupling component | Z | X |
|---|---|---|---|---|
| 125 | 1-SO₃H, 2-NH₂, 5-(Z-HN-CH₂) naphthalene | 1-OH, 2-CH₃, 3-SO₃H, 5-NH-X, 7-SO₃H naphthalene (with HO₃S at 7) | 3-F, 5-CH₃, 6-F pyrimidine (H at 4) | chloro-fluoropyrimidine-triazine with N-phenyl-SO₂-CH₂CH₂-OSO₃H |
| 126 | 1-SO₃H, 2-NH₂, 4-(Z-NH) benzene | 1-OH, 2-CH₃, 3-SO₃H, 6-NH-X naphthalene | 3-F, 4-Cl, 5-CH₃, 6-F pyrimidine | " |
| 127 | 1-SO₃H, 2-NH₂, 4-[Z-N(CH₃)-CH₂] benzene | 1-OH, 2-CH₃, 3-SO₃H, 6-NH-X naphthalene | 3-F, 5-CH₃, 6-F pyrimidine (H at 4) | chloro-fluoropyrimidine-triazine with N-phenyl-SO₂-CH₂CH₂-OSO₃H |
| 128 | 1-SO₃H, 2-NH₂, 4-[Z-N(CH₃)-CH₂] benzene | 1-OH, 2-CH₃, 3-SO₃H, 6-NH-X naphthalene | 3-F, 4-Cl, 5-CH₃, 6-F pyrimidine | " |

We claim:
1. A reactive dyestuff of the formula

$$\left[ \begin{array}{c} R^1 \\ | \\ -N-[D]-N=N-[K]-N- \\ | \\ R \end{array} \right] \begin{array}{c} -X \\ -Z \end{array} \quad (I)$$

wherein
- D = the radical of a diazo component of the benzene or naphthalene series,
- K = the radical of a coupling component of the formula (II)

[structure: naphthalene with OH, $HO_3S$, $(SO_3H)_{0-1}$, and $(NHC(O)-phenyl)_{0-1}$ substituents, with * marking the linkage]

wherein the radical of the formula II and the azo group are linked to one another via the bond marked with *,
- X = a radical of the formula (III)

[triazine structure with $R^2$, N, Hal substituents connected to phenyl ring E with $-B-SO_2M$ group, subscript p]

and the benzene ring E is unsubstituted or further substituted,
- Z = a heterocyclic fibre-reactive radical which differs from X,
- R and $R^1$ = independently of one another H or unsubstituted or substituted $C_1$–$C_6$-alkyl,
- $R^2$ =, unsubstituted or substituted phenyl,
- Hal = halogen,
- p = 0 or 1,
- B = $-(CH_2)_m-$ or $-(CH_2)_2-O-(CH_2)_2-$,
- m = a number from 1 to 6,
- M = $CH=CH_2$ or $CH_2CH_2-V$,
- V = OH or a radical which can be split off under alkaline conditions.

2. The reactive dyestuff according to claim 1, wherein K denotes a bivalent radical of a coupling component of the general formula (IIa)

[naphthalene with OH, $HO_3S$, $(SO_3H)_{0-1}$ and * marking the linkage]

or (IIb)

[naphthalene with OH, $HO_3S$, $SO_3H$, NHCO-phenyl and * marking the linkage]

wherein the radical (IIa) or (IIb) and the azo group are linked to one another via the bond marked with *, D denotes a radical of a diazo component of the general formula (IVa)

[phenyl with $(SO_3H)_{0-2}$, $-(CH_2)_{0-1}-$ and $R^9$]

(IVb)

[naphthalene with $(SO_3H)_{0-3}$ and $-(CH_2)_{0-1}-$]

(IVc)

[two phenyl rings linked by N=N, with $(SO_3H)_{1-2}$, $(CH_2)_{0-1}$, $R^7$, $R^8$]

or (IVd)

[two phenyl rings linked by N=N, with $(SO_3H)_{1-2}$, $R^{10}$]

and
- $R^7$ = H, $C_1$–$C_4$-alkyl, $C_1$–$C_4$-alkoxy, OH or $SO_3H$,
- $R^8$ represents H, $C_1$–$C_4$-alkyl, $C_1$–$C_4$-alkoxy or acylamino and
- $R^9$ and $R^{10}$ independently of one another represent H, $CH_3$, $C_2H_5$ or $OCH_3$.

3. The reactive dyestuff according to claim 1 of the formula (Ia)

$$X-N-[D]-N=N-[K]-N-Z \quad (Ia)$$
$$\phantom{X-N}| \phantom{-[D]-N=N-[K]-N}|$$
$$\phantom{X-N}R^1 \phantom{-[D]-N=N-[K]-N}R$$

wherein
K denotes a radical of the formula (IIc)

(IIc)

[naphthalene with OH, $HO_3S$, $SO_3H$ and * marking the linkage]

wherein the radical of the formula (IIc) and the azo group are linked to one another via the bond marked with *, R represents hydrogen, Z denotes a radical of the formula

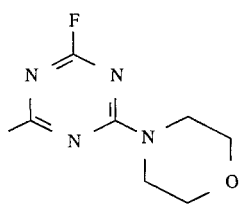

and D, $R^1$ and X have the meanings according to claim 1.

4. The reactive dyestuff according to claim 1, wherein X denotes a radical of the formula

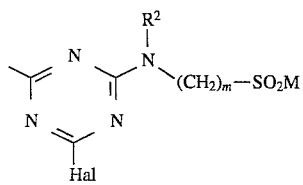 (IIIa)

wherein $R^2$= unsubstituted or substituted phenyl, m=2 or 3,

Hal=F or Cl,

M=CH=CH$_2$ or CH$_2$CH$_2$V and

V=Cl or OSO$_3$H.

5. The reactive dyestuff according to claim 1, wherein Z denotes a fibre-reactive fluorine-containing pyrimidin-6-yl radical or a radical of the formula

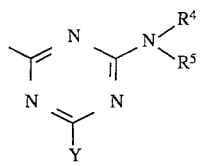 (V)

wherein

Y represents Cl, F or an unsubstituted or substituted pyridinium radical and $R^4$ and $R^5$ independently of one another denote H, unsubstituted or substituted $C_1$–$C_4$-alkyl, $C_6$–$C_{10}$-aryl or $C_5$–$C_6$-cycloalkyl or, together with the amine nitrogen atom, form the radical of a morpholino, piperidino or piperazino ring.

6. The reactive dyestuff according to claim 4, wherein m=2,

M=CH=CH$_2$ or CH$_2$CH$_2$OSO$_3$H and $R^2$=phenyl.

7. The reactive dyestuff according to claim 1 of the formulae (2)–(12)

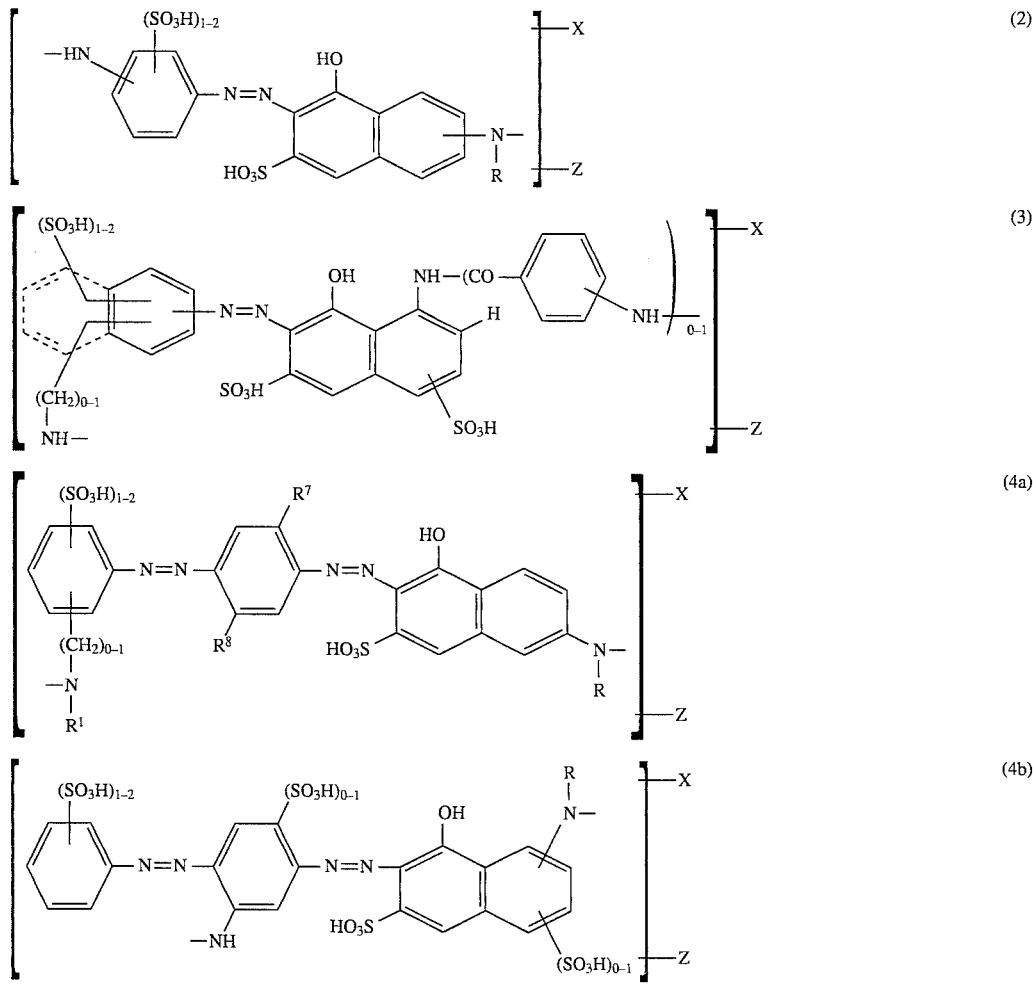

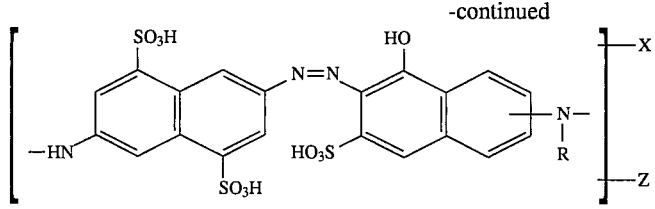 (5)
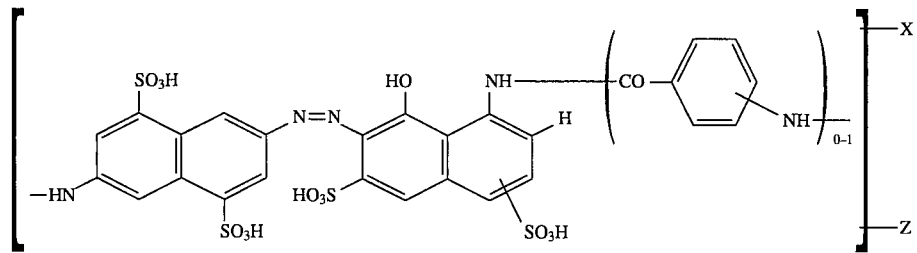 (6)
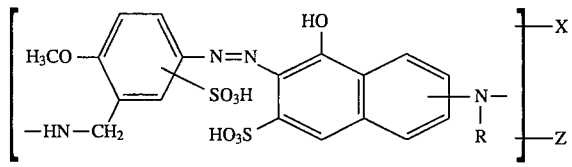 (7)
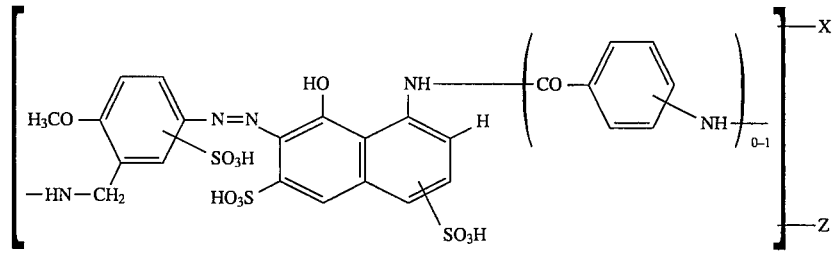 (8)
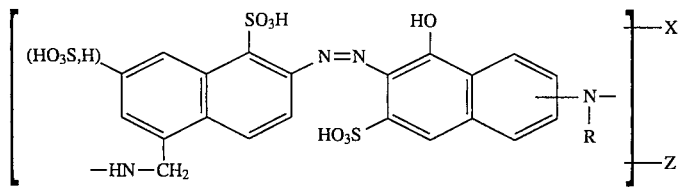 (9)
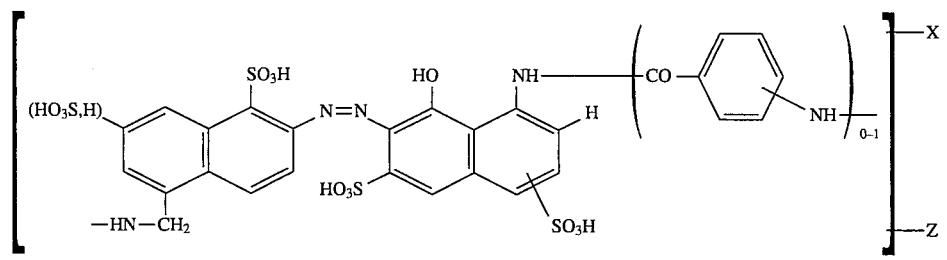 (10)
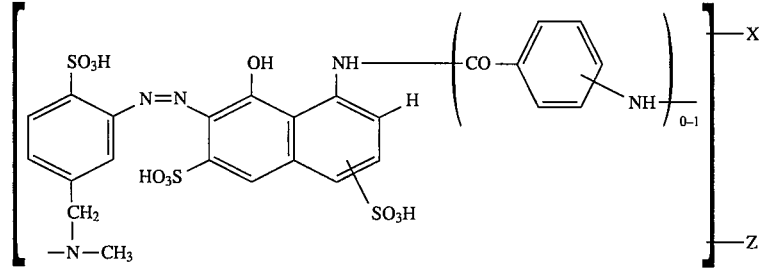 (11)

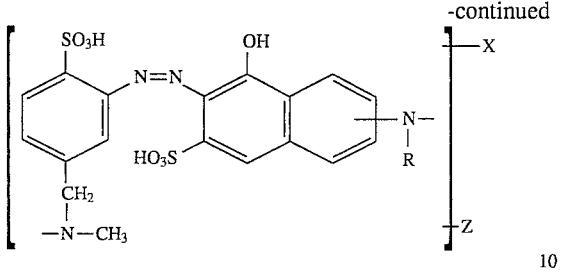

wherein
R=H, $CH_3$ or $C_2H_5$,
$R^7$=H, $C_1$–$C_4$-alkyl, $C_1$–$C_4$-alkoxy, OH or $SO_3H$,
$R^8$=H, $C_1$–$C_4$-alkyl, $C_1$–$C_4$-alkoxy or acylamino, and
X and Z have the meaning given in claim 1.

8. The reactive dyestuff according to claim 1 of the formula

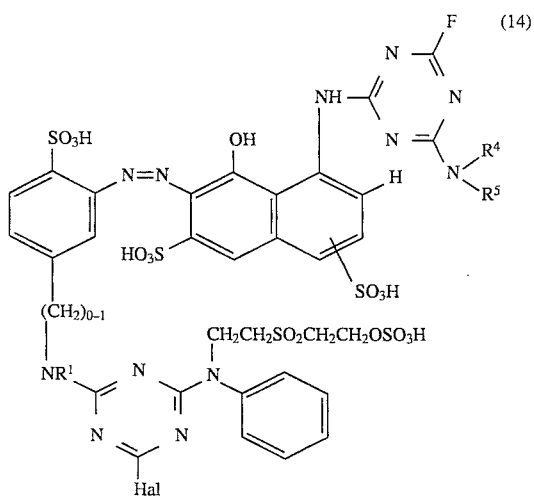

wherein
Hal=Cl or F,
$R^1$=H, $CH_3$ or $C_2H_5$ and
$R^4$ and $R^5$ independently of one another denote H, unsubstituted or substituted $C_1$–$C_4$-alkyl, $C_6$–$C_{10}$-aryl or $C_5$–$C_6$- cycloalkyl or, together with the amine nitrogen atom, form the radical of a morpholino, piperidino or piperazino ring.

9. The reactive dyestuff according to claim 1, wherein $R^2$ is phenyl optionally substituted by $CH_3$, $C_2H_5$ or $SO_3H$.

10. The reactive dyestuff according to claim 1, wherein $R^2$ is phenyl substituted by $CH_3$, $C_2H_5$ or $SO_3H$.

11. In the dyeing or printing of a synthetic material containing hydroxyl or amino groups by applying thereto a reactive dyestuff, the improvement wherein such reactive dyestuff comprises a compound according to claim 1.

12. A textile product which is dyed or printed with a dyestuff of the formula I according to claim 1.

* * * * *

UNITED STATES PATENT AND TRADEMARK OFFICE
CERTIFICATE OF CORRECTION

PATENT NO. : 5,541,300
DATED : July 30, 1996
INVENTOR(S) : Bootz, et al.

It is certified that error appears in the above-indentified patent and that said Letters Patent is hereby corrected as shown below:

Title Page    [57]   Abstract:   Line 2 delete

" $\left[ -\underset{|}{N}-[D]-N=N-[K]-\underset{|}{N}- \right]_{-X}^{-X}$ "  and substitute -- $\left[ -\underset{|}{N}-[D]-N=N-[K]-\underset{|}{N}- \right]_{-Z}^{-X}$ --

Signed and Sealed this

Twenty-sixth Day of November 1996

Attest:

BRUCE LEHMAN

Attesting Officer            Commissioner of Patents and Trademarks